United States Patent
Burger et al.

(10) Patent No.: US 10,169,044 B2
(45) Date of Patent: Jan. 1, 2019

(54) PROCESSING AN ENCODING FORMAT FIELD TO INTERPRET HEADER INFORMATION REGARDING A GROUP OF INSTRUCTIONS

(71) Applicant: Microsoft Technology Licensing, LLC, Redmond, WA (US)

(72) Inventors: Doug Burger, Bellevue, WA (US); Aaron Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/752,727

(22) Filed: Jun. 26, 2015

(65) Prior Publication Data

US 2016/0378494 A1    Dec. 29, 2016

(51) Int. Cl.
*G06F 9/38*    (2018.01)

(52) U.S. Cl.
CPC .......... *G06F 9/3802* (2013.01); *G06F 9/3814* (2013.01); *G06F 9/3853* (2013.01)

(58) Field of Classification Search
CPC ........ G06F 9/3802; G06F 9/28; G06F 9/3814; G06F 9/32; G06F 15/80; G06F 9/3005; G06F 9/3842; G06F 9/3822; G06F 9/3836; G06F 9/30054; G06F 9/3804; G06F 9/3846; G06F 9/3859; G06F 9/3891; G06F 9/3808; G06F 9/382; G06F 9/3838; G06F 9/3817; G06F 9/322; G06F 9/30061; G06F 9/3851
USPC ........................................ 712/206, 214, 233
See application file for complete search history.

(56) References Cited

U.S. PATENT DOCUMENTS

| | | |
|---|---|---|
| 5,142,631 A | 8/1992 | Murray et al. |
| 5,333,280 A | 7/1994 | Ishikawa et al. |
| 5,333,283 A | 7/1994 | Emma et al. |
| 5,363,495 A | 11/1994 | Fry et al. |
| 5,615,350 A | 3/1997 | Hesson et al. |
| 5,790,822 A | 8/1998 | Sheaffer et al. |
| 5,796,997 A | 8/1998 | Lesartre et al. |
| 5,799,167 A | 8/1998 | Lesartre |
| 5,845,102 A | 12/1998 | Miller et al. |

(Continued)

FOREIGN PATENT DOCUMENTS

| | | |
|---|---|---|
| CN | 101344843 A | 1/2009 |
| CN | 102096579 A | 6/2011 |

(Continued)

OTHER PUBLICATIONS

Burger, D et al. Design and Implementation of the TRIPS EDGE Architecture. Jun. 4, 2005. Retrieved from the Internet <URL:https://www.cs.utexas.edu/~trips/talks/trips_tutorial_6up.pdf>.*

(Continued)

*Primary Examiner* — Aimee Li
*Assistant Examiner* — Shawn Doman
(74) *Attorney, Agent, or Firm* — Ranjeev Singh; Singh Law, PLLC

(57) ABSTRACT

A method including fetching information regarding a group of instructions, where the group of instructions is configured to execute atomically by a processor, including an encoding format for the information regarding the group of instructions, is provided. The method further includes processing the encoding format to interpret the information regarding the group of instructions.

15 Claims, 6 Drawing Sheets

(56) References Cited

U.S. PATENT DOCUMENTS

| | | |
|---|---|---|
| 5,845,103 A | 12/1998 | Sodani et al. |
| 5,903,750 A | 5/1999 | Yeh et al. |
| 5,933,642 A * | 8/1999 | Greenbaum ............ G06F 8/447 |
| | | 712/1 |
| 5,943,501 A | 8/1999 | Burger et al. |
| 5,983,337 A | 11/1999 | Mahalingaiah et al. |
| 5,999,737 A | 12/1999 | Srivastava |
| 6,016,399 A | 1/2000 | Chang |
| 6,044,222 A | 3/2000 | Simons et al. |
| 6,058,438 A | 5/2000 | Diehl et al. |
| 6,061,776 A | 5/2000 | Burger et al. |
| 6,112,019 A | 8/2000 | Chamdani et al. |
| 6,161,170 A | 12/2000 | Burger et al. |
| 6,164,841 A | 12/2000 | Mattson et al. |
| 6,167,491 A | 12/2000 | McAlpine |
| 6,185,675 B1 | 2/2001 | Kranich et al. |
| 6,212,622 B1 | 4/2001 | Witt |
| 6,275,919 B1 | 8/2001 | Johnson |
| 6,279,101 B1 | 8/2001 | Witt et al. |
| 6,286,135 B1 | 9/2001 | Santhanam |
| 6,301,673 B1 | 10/2001 | Foster et al. |
| 6,360,309 B1 | 3/2002 | Iadonato et al. |
| 6,453,344 B1 | 9/2002 | Ellsworth et al. |
| 6,493,820 B2 | 12/2002 | Akkary et al. |
| 6,513,109 B1 | 1/2003 | Gschwind et al. |
| 6,523,110 B1 | 2/2003 | Bright et al. |
| 6,529,922 B1 | 3/2003 | Hoge |
| 6,779,100 B1 | 8/2004 | Keltcher et al. |
| 6,851,043 B1 | 2/2005 | Inoue |
| 6,877,059 B2 | 4/2005 | Solomon et al. |
| 6,918,032 B1 | 7/2005 | Abdallah et al. |
| 6,934,254 B2 | 8/2005 | Brown et al. |
| 6,934,828 B2 | 8/2005 | Parthasarathy et al. |
| 6,957,320 B2 | 10/2005 | Senter et al. |
| 6,957,435 B2 | 10/2005 | Armstrong et al. |
| 6,965,969 B2 | 11/2005 | Burger et al. |
| 6,988,183 B1 | 1/2006 | Wong |
| 6,993,640 B2 | 1/2006 | Doing et al. |
| 6,996,698 B2 | 2/2006 | Slegel et al. |
| 7,032,217 B2 | 4/2006 | Wu |
| 7,036,036 B2 | 4/2006 | Vorbach et al. |
| 7,051,187 B2 | 5/2006 | Garg et al. |
| 7,051,188 B1 | 5/2006 | Kubala et al. |
| 7,152,155 B2 | 12/2006 | McIlvaine et al. |
| 7,207,038 B2 | 4/2007 | Bicsak et al. |
| 7,210,127 B1 | 4/2007 | Rangachari |
| 7,228,402 B2 | 6/2007 | Rychlik et al. |
| 7,284,100 B2 | 10/2007 | Slegel et al. |
| 7,299,458 B2 | 11/2007 | Hammes |
| 7,308,320 B2 | 12/2007 | Miyamori |
| 7,310,722 B2 | 12/2007 | Moy et al. |
| 7,380,038 B2 | 5/2008 | Gray |
| 7,392,524 B2 | 6/2008 | Ault et al. |
| 7,453,899 B1 | 11/2008 | Vaida et al. |
| 7,490,224 B2 | 2/2009 | Abernathy et al. |
| 7,526,637 B2 | 4/2009 | Jung et al. |
| 7,571,284 B1 | 8/2009 | Olson et al. |
| 7,587,578 B2 | 9/2009 | Isobe |
| 7,624,254 B2 | 11/2009 | Smith et al. |
| 7,631,170 B2 | 12/2009 | Dowling |
| 7,664,940 B2 | 2/2010 | Conklin et al. |
| 7,676,650 B2 | 3/2010 | Ukai |
| 7,685,354 B1 | 3/2010 | Hetherington et al. |
| 7,720,991 B1 | 5/2010 | Parent et al. |
| 7,779,213 B2 | 8/2010 | Ferren et al. |
| 7,802,073 B1 | 9/2010 | Cheng et al. |
| 7,805,574 B2 | 9/2010 | Bell et al. |
| 7,853,777 B2 | 12/2010 | Jones et al. |
| 7,873,776 B2 | 1/2011 | Hetherington et al. |
| 7,877,580 B2 | 1/2011 | Eickemeyer et al. |
| 7,877,586 B2 | 1/2011 | Levitan et al. |
| 7,917,733 B2 | 3/2011 | Kazuma |
| 7,958,396 B2 | 6/2011 | Chitsaz et al. |
| 8,010,953 B2 | 8/2011 | Gschwind |
| 8,032,734 B2 | 10/2011 | Svendsen et al. |
| 8,055,881 B2 | 11/2011 | Burger et al. |
| 8,055,885 B2 | 11/2011 | Nakashima |
| 8,127,119 B2 | 2/2012 | Burger et al. |
| 8,151,092 B2 | 4/2012 | Altman et al. |
| 8,166,282 B2 | 4/2012 | Madriles et al. |
| 8,180,997 B2 | 5/2012 | Burger et al. |
| 8,201,024 B2 | 6/2012 | Burger et al. |
| 8,225,315 B1 | 7/2012 | Cheng et al. |
| 8,234,635 B2 | 7/2012 | Isshiki et al. |
| 8,250,555 B1 | 8/2012 | Lee et al. |
| 8,250,556 B1 | 8/2012 | Lee et al. |
| 8,266,413 B2 | 9/2012 | Hwu et al. |
| 8,290,994 B2 | 10/2012 | Allalouf et al. |
| 8,321,850 B2 | 11/2012 | Bruening et al. |
| 8,341,639 B2 | 12/2012 | Lewis |
| 8,380,964 B2 | 2/2013 | Bishop et al. |
| 8,433,885 B2 | 4/2013 | Burger et al. |
| 8,434,074 B2 | 4/2013 | Janczak et al. |
| 8,447,911 B2 | 5/2013 | Burger et al. |
| 8,464,002 B2 | 6/2013 | Burger et al. |
| 8,464,271 B2 | 6/2013 | Eichenberger et al. |
| 8,473,724 B1 | 6/2013 | Kenville et al. |
| 8,510,596 B1 | 8/2013 | Gupta et al. |
| 8,533,436 B2 | 9/2013 | Fryman et al. |
| 8,555,038 B2 | 10/2013 | Olson et al. |
| 8,589,662 B2 | 11/2013 | Altman et al. |
| 8,589,892 B2 | 11/2013 | Fournier et al. |
| 8,612,698 B2 | 12/2013 | Lopez et al. |
| 8,612,726 B2 | 12/2013 | Sharawi et al. |
| 8,677,105 B2 | 3/2014 | Abdallah |
| 8,756,605 B2 | 6/2014 | Aingaran et al. |
| 8,817,793 B2 | 8/2014 | Mushano |
| 8,909,941 B1 * | 12/2014 | Trimberger ............ G06F 21/64 |
| | | 713/190 |
| 8,930,678 B2 | 1/2015 | Madduri et al. |
| 9,021,241 B2 | 4/2015 | Burger et al. |
| 9,043,769 B2 | 5/2015 | Vorbach |
| 9,053,292 B2 | 6/2015 | Abdallah |
| 2003/0004683 A1 | 1/2003 | Nemawarkar |
| 2003/0012225 A1 | 1/2003 | Banerjee et al. |
| 2003/0065835 A1 | 4/2003 | Maergner et al. |
| 2003/0101208 A1 | 5/2003 | Chauvel et al. |
| 2003/0149862 A1 | 8/2003 | Kadambi |
| 2004/0123078 A1 | 6/2004 | Hum et al. |
| 2004/0139299 A1 | 7/2004 | Busaba et al. |
| 2005/0076194 A1 | 4/2005 | Kanapathippillai et al. |
| 2006/0020769 A1 | 1/2006 | Herrell et al. |
| 2006/0020944 A1 | 1/2006 | King et al. |
| 2006/0031702 A1 | 2/2006 | Jardine et al. |
| 2006/0041875 A1 | 2/2006 | Peri et al. |
| 2006/0075207 A1 | 4/2006 | Togawa et al. |
| 2006/0136915 A1 | 6/2006 | Aingaran et al. |
| 2006/0259739 A1 | 11/2006 | Asal et al. |
| 2006/0259740 A1 | 11/2006 | Hahn et al. |
| 2006/0282624 A1 | 12/2006 | Yokota |
| 2007/0050557 A1 | 3/2007 | Ferren et al. |
| 2007/0055827 A1 | 3/2007 | Tsien |
| 2007/0074011 A1 | 3/2007 | Borkar et al. |
| 2007/0113171 A1 | 5/2007 | Behrens et al. |
| 2007/0157006 A1 | 7/2007 | Jourdan et al. |
| 2007/0162906 A1 | 7/2007 | Chandhoke |
| 2007/0192540 A1 | 8/2007 | Gara et al. |
| 2007/0239965 A1 | 10/2007 | Lewites et al. |
| 2007/0255980 A1 | 11/2007 | Endo et al. |
| 2008/0046621 A1 | 2/2008 | Okino et al. |
| 2008/0109668 A1 | 5/2008 | Atkinson |
| 2008/0126750 A1 | 5/2008 | Sistla |
| 2008/0192050 A1 | 8/2008 | Schardt et al. |
| 2008/0235493 A1 | 9/2008 | Fortier |
| 2008/0235499 A1 | 9/2008 | Togawa |
| 2008/0244506 A1 | 10/2008 | Killian et al. |
| 2008/0250227 A1 | 10/2008 | Linderman et al. |
| 2009/0013135 A1 | 1/2009 | Burger et al. |
| 2009/0013153 A1 | 1/2009 | Hilton |
| 2009/0013160 A1 | 1/2009 | Burger et al. |
| 2009/0150657 A1 | 6/2009 | Gschwind et al. |
| 2009/0172365 A1 | 7/2009 | Orenstien et al. |
| 2009/0177843 A1 | 7/2009 | Wallach et al. |
| 2009/0187739 A1 | 7/2009 | Nemirovsky et al. |

(56) References Cited

U.S. PATENT DOCUMENTS

| | | | |
|---|---|---|---|
| 2009/0228690 A1* | 9/2009 | Muff | G06F 9/3838 712/219 |
| 2009/0299966 A1 | 12/2009 | Schneider | |
| 2010/0070958 A1 | 3/2010 | Takagi | |
| 2010/0082947 A1 | 4/2010 | Tramm et al. | |
| 2010/0146209 A1 | 6/2010 | Burger et al. | |
| 2010/0262807 A1 | 10/2010 | Burky et al. | |
| 2010/0325395 A1 | 12/2010 | Burger et al. | |
| 2011/0060889 A1 | 3/2011 | Burger et al. | |
| 2011/0072239 A1 | 3/2011 | Burger et al. | |
| 2011/0078424 A1 | 3/2011 | Boehm et al. | |
| 2011/0219222 A1 | 9/2011 | Eichenberger et al. | |
| 2011/0238953 A1 | 9/2011 | Metsugi et al. | |
| 2011/0252258 A1 | 10/2011 | Im et al. | |
| 2012/0030451 A1 | 2/2012 | Pong et al. | |
| 2012/0079102 A1 | 3/2012 | Damodaran et al. | |
| 2012/0124345 A1 | 5/2012 | Denman et al. | |
| 2012/0131309 A1 | 5/2012 | Johnson et al. | |
| 2012/0216012 A1 | 8/2012 | Vorbach et al. | |
| 2012/0246448 A1 | 9/2012 | Abdallah | |
| 2012/0246450 A1 | 9/2012 | Abdallah | |
| 2012/0303933 A1 | 11/2012 | Manet et al. | |
| 2012/0311306 A1 | 12/2012 | Mushano | |
| 2013/0024676 A1 | 1/2013 | Glew et al. | |
| 2013/0046954 A1 | 2/2013 | Ruehle et al. | |
| 2013/0191817 A1 | 7/2013 | Vorbach | |
| 2013/0198499 A1 | 8/2013 | Dice et al. | |
| 2013/0339470 A1 | 12/2013 | Jeswani et al. | |
| 2014/0033217 A1 | 1/2014 | Vajda et al. | |
| 2014/0082327 A1 | 3/2014 | Ghose | |
| 2014/0095837 A1 | 4/2014 | Plotnikov et al. | |
| 2014/0136822 A1 | 5/2014 | Suggs et al. | |
| 2014/0173222 A1 | 6/2014 | Alapati et al. | |
| 2014/0173262 A1 | 6/2014 | Chheda et al. | |
| 2014/0181475 A1 | 6/2014 | Abdallah | |
| 2014/0189287 A1 | 7/2014 | Plotnikov et al. | |
| 2014/0195787 A1 | 7/2014 | Scalabrino et al. | |
| 2014/0201507 A1 | 7/2014 | Jayaseelan et al. | |
| 2014/0281389 A1 | 9/2014 | Loktyukhin et al. | |
| 2014/0281416 A1 | 9/2014 | Abdallah | |
| 2014/0281424 A1 | 9/2014 | Bobba et al. | |
| 2014/0281434 A1 | 9/2014 | Madriles et al. | |
| 2014/0281435 A1* | 9/2014 | Perkins | G06F 9/30145 712/227 |
| 2014/0281622 A1 | 9/2014 | Wagh et al. | |
| 2014/0282607 A1 | 9/2014 | O'Sullivan et al. | |
| 2014/0298336 A1 | 10/2014 | Taniuchi | |
| 2014/0317387 A1 | 10/2014 | Abdallah | |
| 2014/0331236 A1* | 11/2014 | Mitra | G06F 15/7867 718/105 |
| 2014/0351524 A1 | 11/2014 | Natarajan et al. | |
| 2014/0372736 A1 | 12/2014 | Greenhalgh | |
| 2014/0373022 A1 | 12/2014 | Chan | |
| 2015/0019921 A1 | 1/2015 | Chen et al. | |
| 2015/0067214 A1 | 3/2015 | Henry et al. | |
| 2015/0067662 A1 | 3/2015 | Palalau | |
| 2015/0074355 A1 | 3/2015 | Sampathkumar et al. | |
| 2015/0095628 A1 | 4/2015 | Yamada et al. | |
| 2015/0100757 A1 | 4/2015 | Burger et al. | |
| 2015/0127928 A1 | 5/2015 | Burger et al. | |
| 2015/0199199 A1 | 7/2015 | Burger et al. | |
| 2015/0199272 A1 | 7/2015 | Goel et al. | |
| 2015/0347133 A1* | 12/2015 | Gschwind | G06F 9/30058 712/239 |
| 2015/0347143 A1 | 12/2015 | Godard et al. | |
| 2016/0055004 A1 | 2/2016 | Grochowski et al. | |
| 2016/0132331 A1* | 5/2016 | Godard | G06F 9/3806 711/137 |
| 2016/0179546 A1 | 6/2016 | Yamada et al. | |
| 2016/0328237 A1 | 11/2016 | Di et al. | |
| 2016/0378479 A1 | 12/2016 | Burger et al. | |
| 2016/0378483 A1 | 12/2016 | Burger et al. | |
| 2016/0378484 A1 | 12/2016 | Burger et al. | |
| 2016/0378488 A1 | 12/2016 | Burger et al. | |
| 2016/0378491 A1 | 12/2016 | Burger et al. | |
| 2016/0378499 A1 | 12/2016 | Burger et al. | |
| 2016/0378502 A1 | 12/2016 | Burger et al. | |
| 2016/0378661 A1 | 12/2016 | Gray et al. | |
| 2017/0083343 A1 | 3/2017 | Burger | |

FOREIGN PATENT DOCUMENTS

| | | |
|---|---|---|
| CN | 102306094 A | 1/2012 |
| CN | 104310225 A | 1/2015 |
| EP | 583089 A2 | 2/1994 |
| EP | 0992894 A1 | 4/2000 |
| EP | 1039374 A2 | 9/2000 |
| EP | 1102163 A2 | 5/2001 |
| EP | 2527972 A2 | 11/2012 |
| WO | 0125903 A1 | 4/2001 |
| WO | 2004001587 A2 | 12/2003 |
| WO | 2006102664 A2 | 9/2006 |
| WO | 2009006607 A1 | 1/2009 |
| WO | 2011031361 A1 | 3/2011 |
| WO | 2013081556 A1 | 6/2013 |
| WO | 2013095635 A1 | 6/2013 |
| WO | 2014014216 A1 | 1/2014 |
| WO | 2014193878 A1 | 12/2014 |
| WO | 2015069583 A1 | 5/2015 |

OTHER PUBLICATIONS

Peon, et al., "HPACK—Header Compression", Published on: Jul. 31, 2014 Available at: http://tools.ietf.org/html/draft-ietf-httpbis-header-compression-09#page-8.

Bakhoda, et al., "E2", Published on: Apr. 21, 2014 Available at: http://research.microsoft.com/en-us/projects/e2/.

Putnam, et al., "Dynamic Vectorization in the E2 Dynamic Multicore Architecture", In Proceedings of ACM SIGARCH Computer Architecture News vol. 38, Issue 4, Jan. 14, 2011, 6 pages.

Smith, et al., "Compiling for EDGE Architectures", In Proceedings of the 4th International Symposium on Code Generation and Optimization, Mar. 26, 2006, 11 pages.

Saravana, at al., "TRIPS: A Distributed Explicit Data Graph Execution (EDGE) Microprocessor", In Proceedings of IEEE HotChips Symposium on High-Performance Chips, Aug. 2007, 13 pages.

Maher, et al., "The Good Block: Hardware/Software Design for Composable, Block-Atomic Processors", In Proceedings of the 15th Workshop on Interaction between Compilers and Computer Architectures, Feb. 12, 2011, 8 pages.

Burger, et al., "Scaling to the End of Silicon with EDGE Architectures", In Proceedings of Computer, vol. 37, Issue 7, Jul. 2004, pp. 44-55.

Smith, Aaron Lee, "Explicit Data Graph Compilation", In Doctoral Dissertation, Dec. 2009, 3 pages.

Gebhart, et al., "An Evaluation of the Trips Computer System", In Proceedings of Fourteenth International Conference on Architectural Support for Programming Languages and Operating Systems, Mar. 7, 2009, 12 pages.

"International Search Report and Written Opinion Issued in PCT Application No. PCT/US2016/038847", dated Nov. 9, 2016, 10 Pages.

Duong, et al., "Compiler-Assisted, Selective Out-of-Order Commit", In Journal of IEEE Computer Architecture Letters, vol. 12, Issue 1, Jan. 2013, 4 Pages.

Duric, et al., "Dynamic-Vector Execution on a General Purpose EDGE Chip Multiprocessor", In International Conference on Embedded Computer Systems: Architectures, Modeling, and Simulation, Jul. 14, 2014, pp. 18-25.

Duric, et al., "EVX: Vector Execution on Low Power EDGE Cores", In Proceedings of Conference on Design, Automation and Test in Europe Conference and Exhibition, Mar. 24, 2014, 4 Pages.

Duric, et al., "ReCompac: Reconfigurable Compute Accelerator", In International Conference on Reconfigurable Computing and FPGAs, Dec. 9, 2013, 4 Pages.

Essen, et al., "Energy-Efficient Specialization of Functional Units in a Coarse-Grained Reconfigurable Array", In Proceedings of the

(56) References Cited

OTHER PUBLICATIONS

19th ACM/SIGDA International Symposium on Field Programmable Gate Arrays, Feb. 27, 2011, 4 Pages.
Fallin, et al., "The Heterogeneous Block Architecture", In Proceedings of 32nd IEEE International Conference on Computer Design, Oct. 19, 2014, 8 Pages.
Gaudiot, et al., "The Sisal Model of Functional Programming and its Implementation", In Proceedings of Second Aizu International Symposium on Parallel Algorithms/Architectures Synthesis, Mar. 17, 1997, 12 Pages.
Sankaralingam, et al., "TRIPS: A Polymorphous Architecture for Exploiting ILP, TLP and DLP" In ACM Transactions on Architecture and Code Optimization, vol. 1, Issue 1, Mar. 1, 2004, pp. 62-93.
Gonzalez, et al., "Dependence Speculative Multithreaded Architecture", In Technical Report, Retrieved on Jul. 1, 2015, 22 Pages.
Govindan, et al., "Scaling Power and Performance via Processor Composability", In Journal, IEEE Transactions on Computers, vol. 63, Issue 8, Aug. 2014, 14 Pages.
Govindaraju, et al., "DySER: Unifying Functionality and Parallelism Specialization for Energy-Efficient Computing", In IEEE Micro, vol. 32, Issue 5, Jul. 10, 2012, pp. 38-51.
Gulati, et al., "Multitasking Workload Scheduling on Flexible Core Chip Multiprocessors", In Proceedings of International Conference on Parallel Architectures and Compilation Techniques, Oct. 25, 2008, 10 Pages.
Gupta, Anshuman, "Design Decisions for Tiled Architecture Memory Systems", Retrieved from «https://pdfs.semanticscholar.org/9100/c6bbb1f56997b8cad6c1661ee1ce1aa90ee5.pdf», Sep. 18, 2009, 14 Pages.
Gupta, et al., "Erasing Core Boundaries for Robust and Configurable Performance", In 43rd Annual IEEE/ACM International Symposium on Microarchitecture, Dec. 4, 2010, 12 Pages.
Hammond, et al., "Programming with Transactional Coherence and Consistency (TCC)", In ACM SIGOPS Operating Systems Review, vol. 38, Issue 5, Oct. 7, 2004, 13 Pages.
Hammond, et al., "Transactional Coherence and Consistency: Simplifying Parallel Hardware and Software", In IEEE Computer Society, vol. 24, Issue 6, Nov. 2004, pp. 92-103.
Hammond, et al., "Transactional Memory Coherence and Consistency", In IEEE Computer Society of SIGARCH Computer Architecture News, vol. 32, Issue 2, Jun. 19, 2004, 12 Pages.
Hao, et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Hayes, et al., "Unified On-chip Memory Allocation for SIMT Architecture", In Proceedings of the 28th ACM International conference on Supercomputing, Jun. 10, 2014, pp. 293-302.
Hruska, Joel, "VISC CPU 'virtual core' design emerges: Could this be the conceptual computing breakthrough we've been waiting for?", Retrieved From «https://www.extremetech.com/extreme/192858-visc-cpu-virtual-core-lesign-emerges-could-this-be-the-conceptual-breakthrough-weve-been-waiting-for», Oct. 24, 2014, 9 Pages.
Huang, et al., "Compiler-Assisted Sub-Block Reuse", In Proceedings of International Conference on Parallel Architectures and Compilation Techniques, May 1, 2000, 21 Pages.
Ipek, et al., "Core Fusion: Accommodating Software Diversity in Chip Multiprocessors", In Proceedings of the 34th Annual International Symposium on Computer Architecture, Jun. 9, 2007, 12 Pages.
Jhala, "Compiler Construction", In Proceedings of 22nd International Conference on Theory and Practice of Software, Mar. 16, 2013, 11 Pages.
Jones, et al., "A Comparison of Data Prefetching on an Access Decoupled and Superscalar Machine", In Proceedings of the Thirtieth Annual IEEE/ACM International Symposium on Microarchitecture, Dec. 3, 1997, 6 Pages.
Junier, et al., "Impact of Instruction Cache Replacement Policy on the Tightness of WCET Estimation", In Proceedings of the 2nd Junior Researcher Workshop on Real-Time Computing, in conjunction to RTNS, Oct. 16, 2008, 4 Pages.
Kamaraj, et al., "Design of Out-Of-Order Superscalar Processor with Speculative Thread Level Parallelism", In Proceedings of International Conference on Innovations in Engineering and Technology, Mar. 21, 2014,pp. 1473-1478.
Kane, "PA-RISC 2.0 Architecture", In Publication of Prentice Hall PTR, Retrieved on Sep. 17, 2015, 28 Pages.
Kavi, et al., "Concurrency, Synchronization, Speculation- the Dataflow Way", In Journal of Advances in Computers, vol. 96, Nov. 23, 2013, 41 Pages.
Keckler, et al., "Tera-Op Reliable Intelligently Adaptive Processing System (Trips)", In AFRL-IF-WP-TR-2004-1514 (Stinfo Final Report), Apr. 2004, 29 Pages.
Kim, et al., "Composable Lightweight Processors", In Proceedings of the 40th Annual IEEE/ACM International Symposium on Microarchitecture, Dec. 1, 2007, pp. 381-393.
Kinsy, et al., "Heracles: A Tool for Fast RTL-Based Design Space Exploration of Multicore Processors", In Proceedings of the ACM/SIGDA International Symposium on Field Programmable Gate Arrays, Feb. 11, 2013, pp. 125-134.
Kocabas, et al., "Enhancing an Embedded Processor Core with a Cryptographic Unit for Performance and Security", In Proceedings of the 4th International Conference on Reconfigurable Computing and FPGAs, Dec. 3, 2008, pp. 409-414.
Kozumplik, et al., "Trips to the Semantic EDGE", Retrieved From «https://web.archive.org/web/20150921054006/http://vbn.aau.dk/ws/files/61072300/1212050422.pdf», Sep. 22, 2015, 28 Pages.
Li, et al., "Code Layout Optimization for Defensiveness and Politeness in Shared Cache", In 43rd International Conference on Parallel Processing, Sep. 9, 2014, 11 Pages.
Li, et al., "Compiler-Assisted Hybrid Operand Communication", In Technical Report of the University of Texas at Austin, Report No. TR-09-33, Nov. 1, 2009, 12 Pages.
Li, et al., "Hybrid Operand Communication for Dataflow Processors", In Workshop on Parallel Execution of Sequential Programs on Multi-core Architectures, Jun. 21, 2009, pp. 61-71.
Maher, Bertrand Allen., "Atomic Block Formation for Explicit Data Graph Execution Architectures",In Dissertation Presented to the Faculty of the Graduate School of the University of Texas at Austin in Partial Fulfillment of the Requirements for the Degree of Doctor of Philosophy, Aug. 2010, 185 Pages.
Maher, et al., "Merging Head and Tail Duplication for Convergent Hyperblock Formation", In Proceedings of the 39th Annual IEEE/ACM International Symposium on Microarchitecture, Dec. 9, 2006, 12 Pages.
Gray, et al., "Towards an Area-Efficient Implementation of a High ILP EDGE Soft Processor: Comparing Out-of-Order Dataflow Instruction Scheduler Designs", In Proceedings of the 22nd IEEE International Symposium on Field-Programmable Custom Computing Machines, May 11, 2014, 1 Page.
McDonald, et al., "Characterization of TCC on Chip-Multiprocessors", In 14th International Conference on Parallel Architectures and Compilation Techniques, Sep. 17, 2005, 12 Pages.
Mei, Bingfeng, et al., "ADRES: an architecture with tightly coupled VLIW processor and coarse-grained reconfigurable matrix", In Proceedings of 13th International conference on Field-Programmable Logic and Applications, Sep. 9, 2003, 10 Pages.
Melvin, et al., "Enhancing Instruction Scheduling with a Block-Structured ISA", In International Journal of Parallel Programming, vol. 23, No. 3, Jun. 1, 1995, pp. 221-243.
Munshi, et al., "A Parameterizable Simd Stream Processor", In Proceedings of Canadian Conference on Electrical and Computer Engineering, May 1, 2005, pp. 806-811.
Muraoka, et al., "VCore-based design methodology", In Proceedings of the Asia and South Pacific Design Automation Conference, Jan. 21, 2003, pp. 441-445.
Nagarajan, et al., "A Design Space Evaluation of Grid Processor Architectures", In Proceedings of the 34th Annual ACM/IEEE International Symposium on Microarchitecture, Dec. 1, 2001, pp. 40-51.

(56) References Cited

OTHER PUBLICATIONS

Sibi, et al., "Scaling Power and Performance via Processor Composability", In Technical Report No. TR-10-14, Department of Computer Sciences, 2010, 20 Pages.
Smith, et al., "Dataflow Predication", In Proceedings of the 39th Annual IEEE/ACM International Symposium on Microarchitecture, Dec. 9, 2006, 12 Pages.
Smith, et al., "TRIPS Application Binary Interface (ABI) Manual", In Technical Report TR-05-22, Department of Computer Sciences, Oct. 10, 2006, 16 Pages.
Sohi, et al., "Multiscalar Processors", In Proceedings of 22nd Annual International Symposium on Computer Architecture, Jun. 22, 1995, 12 Pages.
Sohi, Gurindar, "Retrospective: Multiscalar Processors", In Proceedings of the 25th Annual International Symposium on Computer Architectures, Jun. 27, 1998, pp. 1111-1114.
Souza, et al., "Dynamically Scheduling VLIW Instructions", In Journal of Parallel and Distributed Computing, vol. 60,, Jul. 2000, pp. 1480-1511.
Tamches, et al., "Dynamic Kernel Code Optimization", In Workshop on Binary Translation, Sep. 2001, 10 Pages.
Uhrig, et al., "The Two-dimensional Superscalar GAP Processor Architecture", In International Journal on Advances in Systems and Measurements, vol. 3, Issue 1 & 2, 2010, pp. 71-81.
Valentine, Bob, "Introducing Sandy Bridge", Retrieved from «https://cesga.es/en/paginas/descargaDocumento/id/135», Retrieved Date: Aug. 24, 2015, 54 Pages.
Wilhelm, Reinhard, "Determining Bounds on Execution Times", In Proceedings of Embedded Systems Design and Verification, vol. 1, Aug. 16, 2005, 33 Pages.
"Second Written Opinion Issued in PCTApplication No. PCT/US2016/038847", dated May 30, 2017, 4 pages.
"Cash: A C to Layout Compiler", Retrieved from «http://www.cs.cmu.edu/afs/cs/academic/class/15745-s07/www/papers/cash-journal.pdf», Retrieved Date: Apr. 8, 2015, 29 Pages.
"Explicit Data Graph Execution", Retrieved From «https://en.wikipedia.org/wiki/Explicit_Data_Graph_Execution», Retrieved Date: Jun. 13, 2017, 5 Pages.
"How Many Clock Cycles does a Riscicisc Instruction Take to Execute?", Retrieved from «http://electronics.stackexchange.com/questions/170551/how-many-clock-cycles-does-a-risc-cisc-instruction-take-to-execute», Retrieved Date: Aug. 24, 2015, 5 Pages.
"Intel® 64 Architecture Processor Topology Enumeration", In White Paper of Intel, Dec. 13, 2013, pp. 1-29.
"Load/store architecture", Retrieved From «https://en.wikipedia.org/wiki/Load/store_architecture», Retrieved Date: Sep. 24, 2015, 1 Page.
"Loop-Invariant Code Motion with Unsafe Operations", Retrieved from «https://web.archive.org/web/20150927030042/https://cs.stackexchange.com/questions/28054/loop-invariant-code-motion-with-unsafe-operations», Retrieved Date: Apr. 9, 2015, 4 Pages.
"Microarchitecture", Retrieved from «https://github.com/jbush001/NyuziProcessor/wiki/Microarchitecture», Retrieved Date: Aug. 24, 2015, 7 Pages.
"Optimizations Enabled by a Decoupled Front-End Architecture", In Proceedings of IEEE Transactions on computers, vol. 50 Issue 4, Apr. 1, 2001, 32 Pages.
"Programmatic API for Building Resources", Retrieved From «https://web.archive.org/web/20150706082232/https://jersey.java.net/nonav/documentation/2.0/resource-builder.html», Nov. 3, 2014, 3 Pages.
"Final Office Action Issued in U.S. Appl. No. 14/252,101", dated Jan. 12, 2017, 18 Pages.
"Non-Final Office Action Issued in U.S. Appl. No. 14/252,101", dated Jul. 7, 2016, 18 Pages.
"Non-Final Office Action Issued in U.S. Appl. No. 14/752,356", dated Mar. 21, 2017, 22 Pages.
"Non Final Office Action Issued in U.S. Appl. No. 14/752,418", dated May 18, 2017, 20 Pages.
"Non-Final Office Action Issued in U.S. Appl. No. 14/752,596", dated May 10, 2017, 22 Pages.

"Non Final Office Action Issued in U.S. Appl. No. 14/752,636", dated Apr. 14, 2017, 15 Pages.
"Non Final Office Action Issued in U.S. Appl. No. 14/752,660", dated Apr. 6, 2017, 22 Pages.
"Non-Final Office Action Issued in U.S. Appl. No. 14/752,682", dated May 5, 2017, 10 Pages.
"Notice of Allowance Issued in U.S. Appl. No. 14/752,685", dated Mar. 22, 2017, 12 Pages.
"Notice of Allowance Issued in U.S. Appl. No. 14/752,724", dated May 15, 2017, 15 Pages.
"Non-Final Office Action Issued in U.S. Appl. No. 14/752,797", dated Apr. 18, 2017, 10 Pages.
"Notice of Allowance Issued in U.S. Appl. No. 14/752,747", dated May 11, 2017, 14 Pages.
"Notice of Allowance Issued in U.S. Appl. No. 14/752,768", dated Apr. 28, 2017, 10 Pages.
"Non-Final Office Action Issued in U.S. Appl. No. 14/752,792", dated Apr. 11, 2017, 12 Pages.
"Office Action Issued in European Patent Application No. 14734631.6", dated Sep. 30, 2016, 5 Pages.
Aasaraai, et al., "Design Space Exploration of Instruction Schedulers for Out-of Order Soft Processors", In Proceedings of the International Conference on Field Programmable Technology, Dec. 8, 2010, 4 Pages.
Abraham, et al., "Predictability of Load/Store Instruction Latencies", In Proceedings of the 26th Annual International Symposium on Microarchitecture, Dec. 1, 1993, pp. 139-152.
Appelbe, et al., "Hoisting Branch Conditions—Improving Super-Scalar Processor Performance, Languages and compilers for Parallel Computing", In Proceedings of the 8th International Workshop on Languages and Compilers for Parallel Computing, Aug. 10, 1995, 14 Pages.
August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.
Sankaralingam, et al., "Distributed Microarchitectural Protocols in the Trips Prototype Processor", In Proceedings of the 39th Annual IEEE/ACM International Symposium on Microarchitecture, Dec. 9, 2006, 12 Pages.
Benson, et al., "Design, Integration and Implementation of the DySER Hardware Accelerator", In IEEE 18th International Symposium on High Performance Computer Architecture, Feb. 25, 2012, 12 Pages.
Bouwens, et al., "Architecture Enhancements for the ADRES Coarse-Grained Reconfigurable Array", In Proceedings pf the 3rd International Conference on High Performance Embedded Architectures and Compilers, Jan. 27, 2008, pp. 66-81.
Budiu, et al., "Optimizing Memory Accesses for Spatial Computation", In Proceedings of 1st International Symposium on Code Generation and Optimization, Mar. 23, 2003, 13 Pages.
Budiu, et al., "Pegasus: An Efficient Intermediate Representation", In Technical Report of School of Computer Science, Carnegie Mellon University, Report No. CMU-CS-02-107, Apr. 2002, 20 Pages.
Bush, et al., "Evaluation and Optimization of Signal Processing Kernels on the TRIPS Architecture", In Proceedings of 4th Annual Workshop on Optimizations for DSP and Embedded Systems, Mar. 2006, 10 Pages.
Cain, et al., "Memory Ordering: A Value-Based Approach", In Journal of IEEE Computer Society, vol. 24, Issue 1, Nov. 2004, pp. 110-117.
Carli, Roberto, "Flexible MIPS Soft Processor Architecture", In Technical Report of Massachusetts Institute of Technology, Jun. 16, 2008, pp. 1-49.
Chang, et al., "Cooperative Caching for Chip Multiprocessors", In Proceedings of the 33rd Annual International Symposium on Computer Architecture, Jun. 17, 2006, 12 Pages.
Cheah, et al., "Analysis and Optimization of a Deeply Pipelined FPGA Soft Processor", In Proceedings of International Conference on Field-Programmable Technology, Dec. 10, 2014, 4 Pages.

(56) References Cited

OTHER PUBLICATIONS

Chiu, et al., "Hyperscalar: A Novel Dynamically Reconfigurable Multi-core Architecture", In Proceedings of 39th International Conference on Parallel Processing, Sep. 13, 2010, 10 Pages.

Chrysos, et al., "Memory Dependence Prediction using Store Sets", In Proceedings of the 25th Annual International Symposium on Computer Architecture, Jun. 1998, pp. 142-153.

Coons, et al., "A Spacial Path Scheduling Algorithm for EDGE Architectures", In Proceedings of the 12th International Conference on Architectural Support for Programming Languages and operating Systems, Oct. 20, 2006, 12 Pages.

Zmily, et al., "Improving Instruction Delivery with a Block-Aware ISA", In Proceedings of 11th International Euro-Par Conference on Parallel Processing, Aug. 30, 2005, pp. 530-539.

Coons, et al., "Feature Selection for Instruction Placement in an EDGE Architecture", Retrieved From «https://pdfs.semanticscholar.org/4c38/8fbe53827627c21a9d2a650395ed4470e544.pdf», Mar. 17, 2007, 6 Pages.

Cooper, et al., "Loop Invariant Code Motion—Classical Approaches", Retrieved from «http://www.google.co.in/urlsa=t&rct=j&q=&esrc=s&source=web&cd=2&ved=0ahUKEwi5taH_r6jUAhWGvY8KHG66BboQFggjMAE&url=http%3A%2F%», Retrieved Date: Apr. 8, 2015, 19 Pages.

Desikan, et al., "Scalable Selective Re-Execution for EDGE Architectures", In Proceedings of the 11th International Conference on Architectural Support for Programming Languages and Operating Systems, Oct. 7, 2004, 13 Pages.

Nagarajan, et al., "Critical Path Analysis of the TRIPS Architecture", In IEEE International Symposium on Performance Analysis of Systems and Software, Mar. 19, 2006, 11 Pages.

Nagarajan, et al., "Static Placement, Dynamic Issue (SPDI) Scheduling for EDGE Architectures", In Proceedings of the 13th International Conference on Parallel Architectures and Compilation Techniques, Sep. 29, 2004, 11 Pages.

Nethercote, et al., "Self-Evaluating Compilation Applied to Loop Unrolling", In Technical Report of the University of Texas at Austin, Report No. TR-06, Feb. 2006, 17 Pages.

Park, et al., "Polymorphic Pipeline Array: A Flexible Multicore Accelerator with Virtualized Execution for Mobile Multimedia Applications", In Proceedings of the 42nd Annual IEEE/ACM International Symposium on Microarchitecture, Dec. 12, 2009, pp. 370-380.

Park, et al., "Reducing Design Complexity of the Load/Store Queue", In Proceedings of the 36th annual IEEE/ ACM International Symposium on Microarchitecture, Dec. 3, 2003, 12 Pages.

"International Preliminary Report on Patentability Issued in PCT Patent Application No. PCT/US2014/039654", dated Aug. 17, 2015, 11 Pages.

"International Search Report & Written Opinion for PCT Patent Application No. PCT/US2014/039654", dated Aug. 26, 2014, 13 Pages.

Zmily, et al., "Block-Aware Instruction Set Architecture", In Proceedings of ACM Transactions on Architecture and Code Optimization, vol. 3, Issue 3, Sep. 2006, pp. 327-357.

"Second Written Opinion Issued in PCT Patent Application No. PCT/US2014/039654", dated Mar. 3, 2015, 7 Pages.

"Second Written Opinion Issued in PCT Application No. PCT/US2016/038842", dated May 30, 2017, 5 Pages.

"International Search Report and Written Opinion Issued in PCT Application No. PCT/US2016/038843", dated Oct. 10, 2016, 11 Pages.

"International Search Report and Written Opinion Issued in PCT Application No. PCT/US2016/038845", dated Sep. 30, 2016, 14 Pages.

"International Search Report and Written Opinion Issued in PCT Application No. PCT/US2016/038846", dated Oct. 6, 2016, 11 Pages.

"Second Written Opinion issued in PCT Application No. PCT/US2016/038846", dated Apr. 7, 2017, 5 Pages.

Xue, et al., "Partial Dead Code Elimination on Predicated Code Regions", In Journal of Software—Practice & Experience, vol. 36, Issue 15, Dec. 2006, pp. 1655-1686.

"International Search Report and Written Opinion Issued in PCT Application No. PCT/US2016/038848", dated Oct. 15, 2016, 11 Pages.

"International Search Report and Written Opinion Issued in PCT Application No. PCT/US2016/038849", dated Sep. 30, 2016, 15 Pages.

"International Search Report and Written Opinion Issued in PCT Application No. PCT/US2016/038850", dated Sep. 22, 2016, 12 Pages.

"International Search Report and Written Opinion Issued in PCT Application No. PCT/US2016/038851", dated Sep. 27, 2016, 11 Pages.

"International Search Report and Written Opinion Issued in PCT Application No. PCT/US2016/038852", dated Sep. 23, 2016, 14 Pages.

"Second Written Opinion Issued in PCT Application No. PCT/US2016/038852", dated May 24, 2017, 5 Pages.

"International Search Report and Written Opinion Issued in PCT Application No. PCT/US2016/038853", dated Sep. 22, 2016, 15 Pages.

"Second Written Opinion Issued in PCT Application No. PCT/US2016/038853", dated May 24, 2017, 6 Pages.

"International Search Report and Written Opinion Issued in PCT Application No. PCT/US2016/038854", dated Sep. 22, 2016, 13 Pages.

"International Search Report and Written Opinion Issued in PCT Application No. PCT/US2016/038855", dated Sep. 27, 2016, 13 Pages.

"Second Written Opinion Issued in PCT Application No. PCT/US2016/038855", dated May 18, 2017, 8 Pages.

"International Search Report and Written Opinion Issued in PCT Application No. PCT/US2016/051209", dated Dec. 16, 2016, 10 Pages.

"International Search Report and Written Opinion Issued in PCT Application No. PCT/US2016/051413", dated Jan. 2, 2017, 16 Pages.

"International Search Report and Written Opinion Issued in PCT Application No. PCT/US2016/051417", dated Dec. 15, 2016, 10 Pages.

Pengfei, et al., "M5 Based EDGE Architecture Modeling", In IEEE International Conference on Computer Design, Oct. 3, 2010, pp. 289-296.

Wu et al. "Block Based Fetch Engine for Superscalar Processors", In Proceedings of the 15th International Conference on Computer Applications in Industry and Engineering, Nov. 7, 2002, 4 Pages.

Pericas, et al., "A Decoupled KILO-Instruction Processor", In the Twelfth International Symposium on High-Performance Computer Architecture, Feb. 11, 2006, 12 Pages.

Pericas, et al., "A Two-Level Load/Store Queue Based on Execution Locality", In Proceedings of 35th International Symposium on Computer Architecture, Jun. 21, 2008, 12 Pages.

Pierce, et al., "Wrong-Path Instruction Prefetching", In Proceedings of the 29th Annual IEEE/ ACM International Symposium on Microarchitecture, Dec. 2, 1996, 17 Pages.

Pricopi, Mihai, et al., "Bahurupi: A Polymorphic Heterogeneous Multi-Core Architecture.", In the ACM Transactions on Architecture and Code Optimization, vol. 8, No. 4., Jan. 1, 2012, pp. 1-22.

"International Search Report and Written Opinion Issued in PCT Application No. PCT/US2016/038842", dated Oct. 6, 2016, 11 Pages.

Rahman, Rezaur, "Intel® Xeon Phi Core Micro-Architecture", Retrieved from «https://software.intel.com/en-us/articles/intel-xeon-phi-core-micro-architecture», May 31,2013, 28 Pages.

Robatmili, et al., "Exploiting Criticality to Reduce Bottlenecks in Distributed Uniprocessors", In 17th IEEE International Symposium on High-Performance Computer Architecture, Feb. 2011, 12 Pages.

Robatmili, et al., "How to Implement Effective Prediction and Forwarding for Fusable Dynamic Multicore Architectures", In Proceedings of IEEE 19th International Symposium on High Performance Computer Architecture, Feb. 23, 2013, 12 Pages.

(56) References Cited

OTHER PUBLICATIONS

Robatmili, et al., "Strategies for Mapping Dataflow Blocks to Distributed Hardware", In the proceedings of the 41st IEEE/ACM International Symposium on Microarchitecture, Nov. 8, 2008, pp. 23-34.
Roesner, et al., "Counting Dependence Predictors", In Undergraduate Honors Thesis, May 2, 2008, 25 Pages.
Sankaralingam, et al., "Exploiting ILP, TLP, and DLP with Polymorphous Trips Architecture", In Proceedings of 30th Annual International Symposium on Computer Architecture, Jun. 9, 2003, 12 Pages.
Wong, et al., "Efficient Methods for Out-of-Order Load/Store Execution for High-Performance soft Processors", In Proceedings of International Conference on Field-Programmable Technology, Dec. 9, 2013, pp. 442-445.
Sarkar, et al., "Understanding Power Multiprocessors", In Proceedings of the 32nd ACM SIGPLAN Conference on Programming Language Design and Implementation, Jun. 4, 2011, pp. 175-186.
Sethumadhavan, et al., "Design and Implementation of the Trips Primary Memory System", In Proceedings of International Conference on Computer Design, ICCD, Oct. 1, 2006, 7 Pages.
Sethumadhavan, et al., "Late-Binding: Enabling Unordered Load-Store Queues", In Proceedings of the 34th Annual International Symposium on Computer Architecture, Jun. 9, 2007, pp. 347-357.
"Control Flow Graphs and Loop Optimization", Retrieved from «https://engineering.purdue.edu/~milind/ece573/2011spring/lecture-11.pdf», downloaded on Nov. 7, 2014, 38 Pages.
Zmily, et al., "Block-Aware Instruction Set Architecture", In Doctoral Dissertation, Degree of Doctor of Philosophy, Stanford University, Jun. 2007, 176 Pages. (at least pp. v and vi, pp. 1-110 and pp. 132-152 are relevant).
Anderson, Michael, "A Framework for Composing High-Performance OpenCL from Python Descriptions", In Technical Report of Electrical Engineering and Computer Sciences, University of California at Berkeley, Report No. UCB/EECS- 2014-210, Dec. 5, 2014, 144 Pages. (at least pp. 6-19, pp. 32-83, and pp. 118-132 are relevant).
Choudhury, A.N.M Imroz., "Visualizing Program Memory Behavior Using Memory Reference Traces", In Ph.D. Thesis of University of Utah,, Aug. 2012, 158 Pages. (at least p. 4 and pp. 15-158 are relevant).
Robatmili, Behnam, "Efficient Execution of Sequential Applications on Multicore systems", Dissertation Presented to the Faculty of the Graduate School of the University of Texas at Austin in Partial Fulfilment of the Requirements for he Degree of the Doctor of Philosophy, Aug. 2011, 198 Pages. (at least pp. vi-vii and 1-181 are relevant).
Sankaralingam, Karthikeyan, "Polymorphous Architectures: A Unified Approach for Extracting Concurrency of Different Granularities", In Doctoral Dissertation of Philosophy, Aug. 2007, 276 Pages. (at least pp. vii-ix and 1-257 are relevant).
Dittmann, Gero, "On Instruction-Set Generation for Specialized Processors", In Dissertation Submitted to The Swiss Federal Institute of Technology Zurich for the Degree of Doctor of Technical Sciences, 2005, 122 Pages. (at least p. iii and pp. 1-106 are relevant).
Govindan, Madhu Sarava., "E3:Energy-Efficient EDGE Architectures", In Dissertation Presented to the Faculty of Graduate School of the university of Texas in Partial Fulfillment of the Requirements for the Degree of doctor of Philosophy, Aug. 2010, 244 Pages. (at least pp. xii-xv and pp. 1-217 are relevant).
Huang, Jian, "Improving Processor Performance Through Compiler-Assisted Block Reuse", A Dissertation Submitted in Partial Fulfillment of the Requirements for the Degree of Doctor of Philosophy, May 2000, 125 Pages. (at least pp. i-ii and pp. 1-114 are relevant).
Liu, Haiming, "Hardware Techniques to Improve Cache Efficiency", In Dissertation of the University of Texas at Austin, May 2009, 189 Pages. (at least pp. vii-xi and pp. 1-166 are relevant).
McDonald, et al., "TRIPS Processor Reference Manual", In Technical Report of Department of Computer Sciences, The University of Texas at Austin, Report No. TR-05-19, Mar. 10, 2005, 194 Pages. (at least pp. 7-194 are relevant).
Nagarajan, Ramadass, "Design and Evaluation of a Technology-Scalable Architecture for Instruction-Level Parallelism", In Doctoral Dissertation, May 2007, 260 pages (at least pp. 9-201 are relevant).
Pickett, Christopher John Francis., "Software Method Level Speculation for Java", In Thesis Submitted to Mcgill University in Partial Fulfillment of the Requirement of the Degree of Doctor of Philosophy, Apr. 2012, 236 Pages. (at least pp. i-ii and pp. 1-22 are relevant).
Uhlig, Richard Albert, "Trap-driven Memory Simulation", In Doctoral Dissertation of Ph.D, Aug. 1995, 203 Pages. (at least pp. 1-8 are relevant).
"International Preliminary Report on Patentability Issued in PCT Application No. PCT/US2016/038847", dated Sep. 18, 2017, 5 Pages.
"International Preliminary Report on Patentability Issued in PCT Patent Application No. PCT/US2016/038846", dated Sep. 10, 2017, 6 Pages.
"Final Office Action Issued in U.S. Appl. No. 14/752,682", dated Sep. 8, 2017, 15 Pages.
"Office Action Issued in Colombian Patent Application No. NC2017/0013251", dated Jul. 4, 2018, 14 Pages. (W/O English Translation).
"Office Action Issued in Colombian Patent Application No. NC2017/0013252", dated Jul. 5, 2018, 13 Pages. (W/O English Translation).
"Office Action Issued in Colombian Patent Application No. NC2017/0013277", dated Jul. 9, 2018, 13 Pages. (W/O English Translation).

* cited by examiner

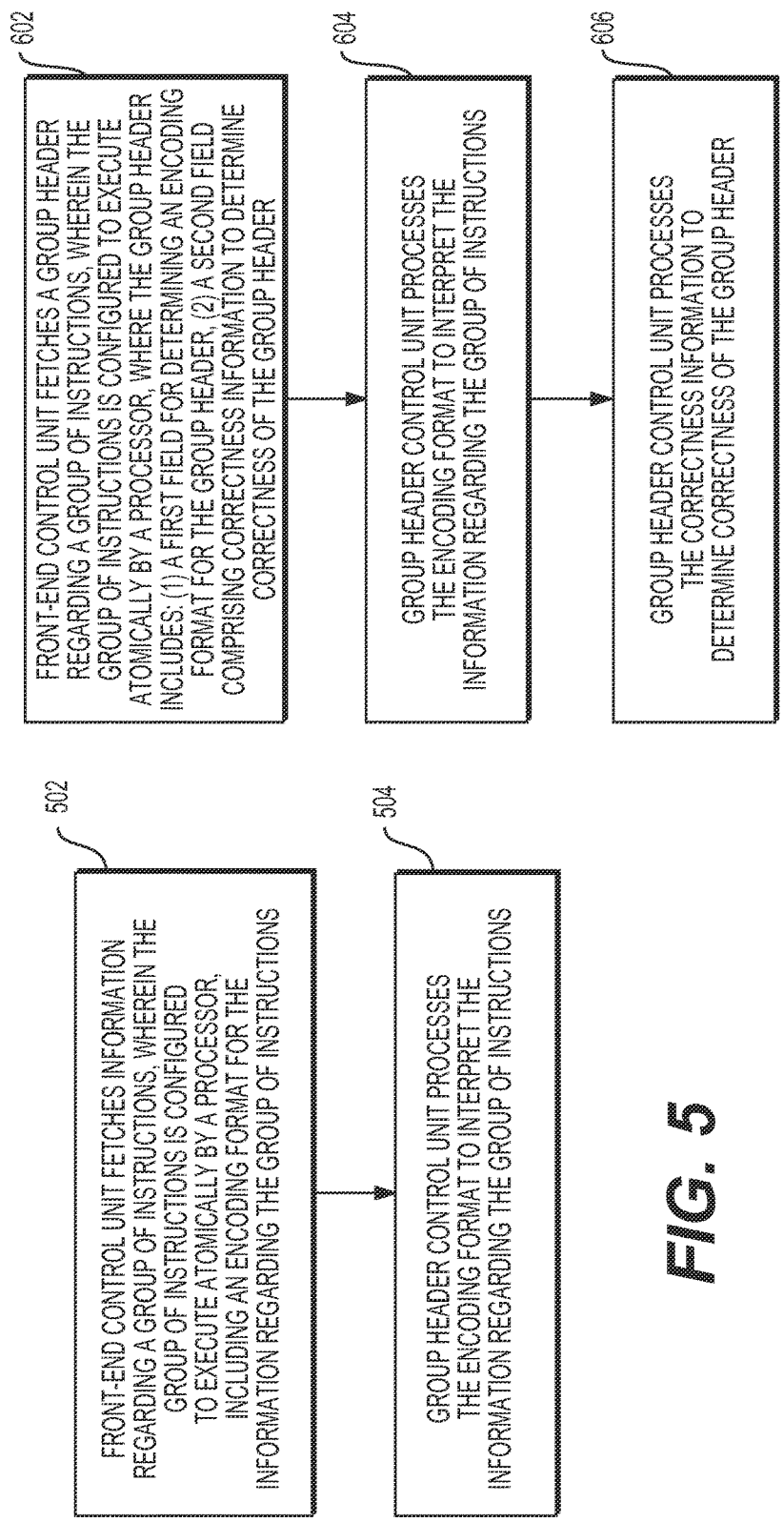

PROCESSING AN ENCODING FORMAT FIELD TO INTERPRET HEADER INFORMATION REGARDING A GROUP OF INSTRUCTIONS

BACKGROUND

Designers of instruction set architectures (ISAs) and processors make power and performance trade-offs. As an example, if a designer chooses an ISA with instructions that deliver higher performance then the power consumption by the processor may be higher, as well. Alternatively, if the designer chooses an ISA with instructions that consume lower power, then the performance may be lower. The power consumption may be tied to the amount of hardware resources of the processor, such as arithmetic logic units (ALUs), cache lines, or registers, used by the instructions during execution. Use of a large amount of such hardware resources may deliver higher performance at the cost of higher power consumption. Alternatively, the use of a small amount of such hardware resources may result in lower power consumption at the cost of lower performance.

Compilers are used to compile high-level code into instructions compatible with the ISA and the processor architecture.

SUMMARY

In one aspect, a method including fetching information regarding a group of instructions, where the group of instructions is configured to execute atomically by a processor, including an encoding format for the information regarding the group of instructions, is provided. The method may further include processing the encoding format to interpret the information regarding the group of instructions.

In another aspect, a method including fetching a group header for a group of instructions, where the group of instructions is configured to execute atomically by a processor, where the group header includes a first field for determining an encoding format for the group header and a second field comprising correctness information to determine correctness of the group header, is provided. The method may further include processing the encoding format to interpret the information regarding the group of instructions. The method may further include processing the correctness information to determine the correctness of the group header.

In yet another aspect, a method including processing a group of instructions, where the group of instructions is configured to execute atomically by a processor, to generate information regarding the group of instructions, including meta-information regarding the group of instructions and an encoding format for the meta-information, where the encoding format is used to interpret the meta-information, is provided. The method may further include storing the meta-information and the encoding format for subsequent processing by the processor.

In yet another aspect, a processor, including a front-end control unit for fetching information regarding a group of instructions, wherein the group of instructions is configured to execute atomically by a processor, including an encoding format for the information regarding the group of instructions, is provided. The processor may further include a format interpretation unit for processing the encoding format to interpret the information regarding the group of instructions, including determining, based at least on the encoding format, at least one of: (a) branch prediction information for the group of instructions, (b) load/store queue information for the group of instructions, (c) exit types information for the group of instructions, (d) an index to at least a portion of an instruction set architecture for the processor, (e) information regarding complexity of load operations and store operations in the group of instructions, or (f) execution requirements for the group of instructions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 5 is a flow diagram of a method in accordance with one example;

FIG. 6 is a flow diagram of a method in accordance with one example; and

DETAILED DESCRIPTION

Figure 1:
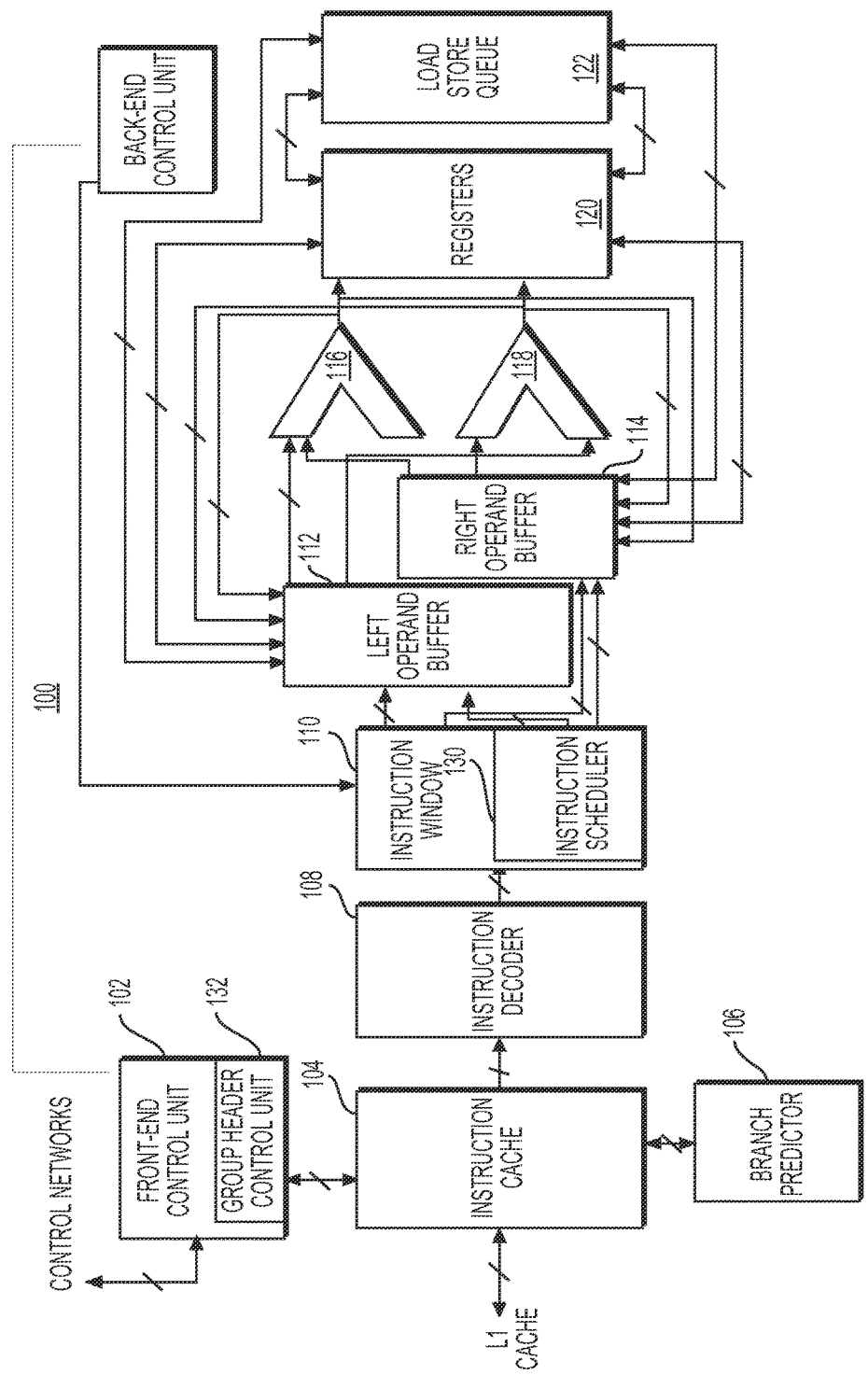
FIG. 1 is a block diagram of a representative processor in accordance with one example.

Examples described in this disclosure relate to instruction set architectures (ISAs) and processors that may have instructions organized in groups, e.g., instruction blocks, that are fetched, executed, and committed atomically. Thus, the processor may fetch the instructions belonging to a single group en masse, map them to the execution resources inside the processor, execute the instructions, and commit their results in an atomic fashion. The processor may either commit the results of all instructions or nullify the execution of the entire group. Instructions inside a group may execute in a data flow order. In addition, the processor may permit the instructions inside a group to communicate directly with each other. An instruction that produces a result may, instead of writing the result to a register file, communicate that result to another instruction that consumes the result. As an example, an instruction that adds the values stored in registers R1 and R2 may be expressed as shown in Table 1:

---
I[0] READ R1 T[2,R];
I[1] READ R2 T[2,L];
I[2] ADD T[3,L].
---

In this way, source operands are not specified with the instruction; instead, they are specified by the instructions that target the ADD instruction. The compiler may explicitly encode the control and data dependencies during compilation of the instructions and thereby free the processor from rediscovering these dependencies at runtime. This may advantageously result in reduced processor load and energy savings during execution of these instructions. As an example, the compiler may use predication to convert all control dependencies into data flow dependencies. Using these techniques, the number of accesses to power hungry register files may be reduced. Table 2, below, shows an example of a general instruction format for such instructions:

| OPCODE | PR | BID | XOP | TARGET1 | TARGET2 |

Each instruction may be of a suitable size, such as 32 bits, 64 bits, or another size. In the example shown in Table 2, each instruction may include an OPCODE field, a PR (predication) field, a BID (broadcast identifier) field, an XOP (extended OPCODE) field, a TARGET1 field, and a TARGET2 field. The OPCODE field may specify a unique operation code for an instruction or a group of instructions, such as add, read, write, or multiply. The PR (predication) field may specify any predication associated with the instruction. As an example, a two bit PR field may be used as follows: 00—not predicated, 01—reserved, 10—predicated on false, and 11—predicated on true. Thus, for example, if an instruction executes only if the result of a comparison is true, then that instruction may be predicated on the result of another instruction that performs the comparison. The BID (broadcast identifier) field may support sending of an operand to any number of consumer instructions in a group. A 2-bit BID field may be used to encode the broadcast channel the instruction receives one of its operands on. The XOP (extended OPCODE) field may support extending the types of opcodes. The TARGET1 and TARGET2 fields may allow up to two target instructions to be encoded. The target field may specify a consumer instruction of the result of the producer instruction, thus permitting direct communication between instructions.

Each group of instructions may have certain information associated with the group of instructions, such as control information related to the group of instructions. This information may be generated by the compiler during compilation of higher-level code, such as C or C++ into instructions for execution on a processor consistent with the present disclosure. Some of this information may be extracted by the compiler when compiling a group of instructions and by examining the nature of the instructions during runtime. Additionally or alternatively, the information associated with the group of instructions may be meta-information concerning the group of instructions. In one example, such information may be encapsulated in a header associated with the group of instructions. Thus, the group header may include control information and/or meta-information regarding the group of instructions. In one example, this information may advantageously help the processor execute the group of instructions more efficiently. One example of a group header with exemplary fields and the exemplary description of each field is in Table 3 below:

| Field | Description |
|---|---|
| ID | This field may be set to 1 to indicate the beginning of a valid group of instructions. It may also include information regarding machine version and architecture version. |
| SIZE | This field may contain the number of 4 instruction chunks contained in a group of instructions. Thus, for example, a value of 00 may indicate the smallest group of instructions in the group, e.g., a group header followed by 4 instructions. A value of 01 may indicate a group header followed by 8 instructions. A value of 10 may indicate a group header followed by 16 instructions. A value of 11 may indicate a group header followed by 32 instructions. This field may encode the size of the group of instructions in other ways. As an example, this field may specify the precise number of instructions in the group, e.g., a group header followed by seven instructions. As another example, this filed may result in the processing of a function by the processor resulting in information about the size. |
| XFLAGS | This field may include flags that indicate special execution requirements for the group of instructions, such as:<br>XFLAGS[0] Vector Mode<br>This flag may indicate that the instructions will be copied into independent vector lanes, each of which may include an instruction window, operand buffers, an ALU, and registers.<br>XFLAGS[1] Inhibit Branch Predictor<br>This flag when set may result in the branch predictor being inhibited. This may prevent the branch predictor from predicting which way a branch will go before this is known for sure.<br>XFLAGS[2] Inhibit Memory Dependence Predictor<br>This flag when set may result in memory dependence being inhibited. This may prevent the memory dependence predictor from predicting dependencies between memory operations, such as load/store operations.<br>XFLAGS[3] Block Synchronization Required<br>This flag when set may impose a requirement that another group of instructions may not be executed on another core in parallel with the current group of instructions. In addition, this flag when set may also impose a requirement that the group of instructions may not execute speculatively.<br>XFLAGS[4] Break After Block<br>This flag when set may indicate that there is a break after the group of instructions.<br>XFLAGS[5] Break Before Block<br>This flag when set may indicate that there is break before the group of instructions.<br>XFLAGS[6] Reserved<br>This flag may be reserved for future use. |

| Field | Description |
| --- | --- |
| EXIT TYPES | This field may encode up to six 3-bit group exit types for use by the branch predictor.<br>000 - Null<br>This branch exit type may indicate to the branch predictor that there is no information for the branch predictor in this field.<br>001 - Sequential<br>This branch exit type may indicate to the branch predictor that the next branch is to the next group of instructions in the code. The sequential branch exit type may be computed by factoring in the current address of the group of instructions and the size of the group of instructions, e.g., a current block address and the size of the block.<br>010 - Offset<br>This branch exit type may indicate to the branch predictor that the next branch is to a block relative offset address, where the offset is treated as a group offset.<br>011 - Indirect<br>This branch exit type may indicate to the branch predictor that the next branch is an indirect type. Thus, for example, it may rely on a register or a memory location that contains the address of the beginning of the successor group of instructions and their associated group header.<br>100 - Call<br>This branch exit type may indicate to the branch predictor that if the successor group of instructions contains a subroutine call then the predicted branch goes to that successor group of instructions.<br>101 - Return<br>This branch exit type may indicate to the branch predictor that if the successor group of instructions contains a return from a subroutine call then the predicted branch goes to that successor group of instructions.<br>Other bit patterns may be reserved for future uses. |
| STORE MASK | This field may identify the load-store identifiers (LSIDs) that are assigned to stores. As an example, the LSQ block may have to receive each of the LSIDs assigned to stores for a group of instructions before the group of instructions is allowed to complete. |
| WRITE MASK | This field may identify the global registers that the group of instructions may write. As an example, the register file may have to receive each entry of writes before the group of instructions is allowed to complete. |
| INDEX TO SPECIFICATION | This field may specify an index to an Instruction Set Architecture (ISA) specification. As an example, the ISA specification may include the class of devices that are supported. The class of devices may refer to whether the device is a high-performance device or an Internet-of-Things, mobile devices, wearable devices or other embedded type of devices. |
| GROUP CORRECTNESS | This field may specify a fixed code pattern or a variable pattern, such as a checksum value, to determine whether the current group of instructions is the correct group. In this way, this field may provide a sanity check to ensure that the jump is to a valid group of instructions. In addition, this field may provide enhanced security because a malware related group of instructions will not pass the group correctness check. |
| ENCODING FORMAT | This field may provide the processor with information regarding how to determine an encoding format for the header. This field may provide the processor with information concerning how to interpret the remaining fields of the group header based on the encoding format. Thus, for example, with three bits in this field eight different formats for header structures could be encoded. When processed this filed may determine the encoding format for the other fields of this table. Each one of the formats for group header structures may include information concerning the fields in that format of the group header structure and the function associated with the fields. As an example, the encoding format could specify the size of the opcodes for a group of instructions. |
| LOAD/ STORE SPECIFICATION | This field may specify whether the load/store operations associated with the group of instructions are simple or complex. As an example, simple stores may relate to storing committed operand values in disparate memory locations, whereas complex stores may relate to storing committed operand values in shared memory locations. |

While the exemplary group header shown in Table 3 includes many fields, it is merely exemplary. In one embodiment, the compiler may select a certain group header structure based on the nature of instructions and/or based on the nature of the processing requirements, such as high-performance or low-power. This may advantageously allow better balancing of trade-offs between performance and power consumption. For certain types of processing applications, such as high performance computing with a large number of cores, a large group header may be a desirable option. Alternatively, for other types of processing applications, such as embedded processors used in the Internet of Things, mobile devices, wearable devices, or other embedded computing type of applications, a smaller group header may be a desirable option. Thus, in one aspect of this disclosure the group header structure could be tailored to specific processing environments. In another aspect, the group header structure could be tailored depending upon the nature of the instructions in the group of instructions. For example, if the group of instructions includes a loop that is executed several times, then a more extensive group header might be needed to encapsulate the control information corresponding to the group of instructions. The additional control information may allow the processor to execute the loop more efficiently and thus improve performance. Alternatively, if there is a group of instructions that will be rarely executed, then the group header for such a group might be smaller. In another example, if the group of instructions includes a predicated control loop, then the group header structure may be more extensive. Similarly, if the group of instructions has an extensive amount of instruction level parallelism, then the group header structure may be more extensive. The additional control information in the group header could be used to effectively exploit the instruction level parallelism in the group of instructions. In another example, if the group of instructions includes several branch instructions, then the group header could be more extensive. The additional control information regarding branch instructions will make the code execution more efficient as it will result in fewer pipeline flushes.

In addition, the functionality corresponding to the fields may be combined or further separated. As an example, while the exemplary group header of Table 3 includes a separate ID field and a SIZE field, these two fields could be combined into a single field. Other changes could be made to the group header structure and format without departing from the scope of this disclosure. As an example, additional fields that include information relating to the characteristics of the group of instructions could be included. Certain fields might be included based on the frequency of the execution of the group of instructions.

The fields included in the group header structure, or a similar set of information, may be part of a publicly available standard Instruction Set Architecture (ISA) of a particular processor or a family of processors. A subset of the fields may be a proprietary extension to the ISA. Certain fields may have access to configurable logic array in the processor, such that a state machine could be invoked that could interpret certain bit values in the field differently depending upon the configurable logic array. Thus, a compiled program may have its own proprietary group header structure that would include processing of certain bit values or fields by a configurable logic array. The configuration of the configurable logic array may be changed on-the-fly to allow for group header structures that can only be interpreted by a processor that has the configurable logic array that can handle such functionality. Alternatively, a certain field or bit values in the field may point to a location in a memory, such as a flash memory, which may be configurable to allow for different interpretations of the field or bit values in the field. Thus, certain bit values in the field may be part of the standard ISA for the processor, but certain other bit values in the field may provide proprietary functionality. This exemplary field could allow an ISA designer to add proprietary extensions to the group header structure without disclosing entirely the nature and the functionality associated with the proprietary extension. Thus, in this instance, the compiler distributed by the ISA designer would support the proprietary bit values in the field or an entirely separate proprietary field. The use of such a field may be particularly relevant to hardware accelerators that are proprietary to certain processor designs. Thus, a program may include a group header field that is unrecognizable; but the program may further include a recipe to decipher the field.

FIG. 1 is a block diagram of a portion of a representative processor 100 in accordance with one example of the present disclosure. Processor 100 may include a front-end control unit 102, an instruction cache 104, a branch predictor 106, an instruction decoder 108, an instruction window 110, a left operand buffer 112, a right operand buffer 114, an arithmetic logic unit (ALU) 116, an arithmetic logic unit (ALU) 118, registers 120, and a load/store queue 122. In some instances, the busses may carry only data and instructions; in some instances, the busses may carry only data (e.g., operands); in other instances the busses may carry only control signals, e.g., front-end control unit 102 may communicate, via a bus that carries only control signals, with other control networks. In one example, front-end control unit 102 may include combinational logic and state machines to handle the front end of the processing, including instruction fetch and decode. As an example, front-end control unit 102 may fetch instructions from a L1-cache or another cache for storing into instruction cache 104 and later for processing by instruction decoder 108. Front-end control unit 102 may exchange control information with other portions of processor 100 via control networks. Processor 100 may include a single core or multiple cores. In that case, there may be multiple instances of at least some of the elements shown in FIG. 1. Front-end control unit 102 may co-ordinate and manage control of various cores and other parts of the processor. Thus, in this example, groups of instructions may be simultaneously executing on multiple cores and front-end control unit 102 may exchange control information via control networks with other cores to ensure synchronization, as needed, for execution of the various groups of instructions. Front-end control unit 102 may fetch and decode a single instruction or multiple instructions per clock cycle. The decoded instructions may be stored in instruction window 110. Instruction window 110 may include an instruction scheduler 130. Instruction scheduler 130 may keep a ready state of each decoded instruction's inputs, e.g., its predication and operands. When all of its inputs (if any) are ready, the instruction may be woken up by instruction scheduler 130 and be ready to issue. Although FIG. 1 shows a certain number of components of processor 100 arranged in a certain manner, there could be more or fewer number of components arranged differently.

Before an instruction is issued, any operands required by the instruction may be stored in left operand buffer 112 and/or right operand buffer 114 (as needed). Depending on the opcode of the instruction, operations may be performed on the operands using ALU 116 and/or ALU 118 or other functional units. The outputs of an ALU may be stored in an operand buffer or stored in one or more registers 120. Store operations that issue in a data flow order may be queued in load/store queue 122 until the group of instruction commits. When the group of instruction commits, load/store queue 122 may write the committed group's stores to a memory.

Branch predictor 106 may process group header information relating to branch exit types and factor that information in making branch predictions.

With continued reference to FIG. 1, front-end control unit 102 may further include a group header control unit 132. Group header control unit 132 may process control information and meta-information regarding a group of instructions that may be executed atomically. In one example, group header control unit 132 may process group headers for such a group of instructions. As discussed earlier with respect to Table 3 the group header may include control information and/or meta-information regarding the group of instructions. Group header control unit 132 may include combinational logic, state machines, and temporary storage units, such as flip-flops to process the various fields in the group header.

Figure 2:
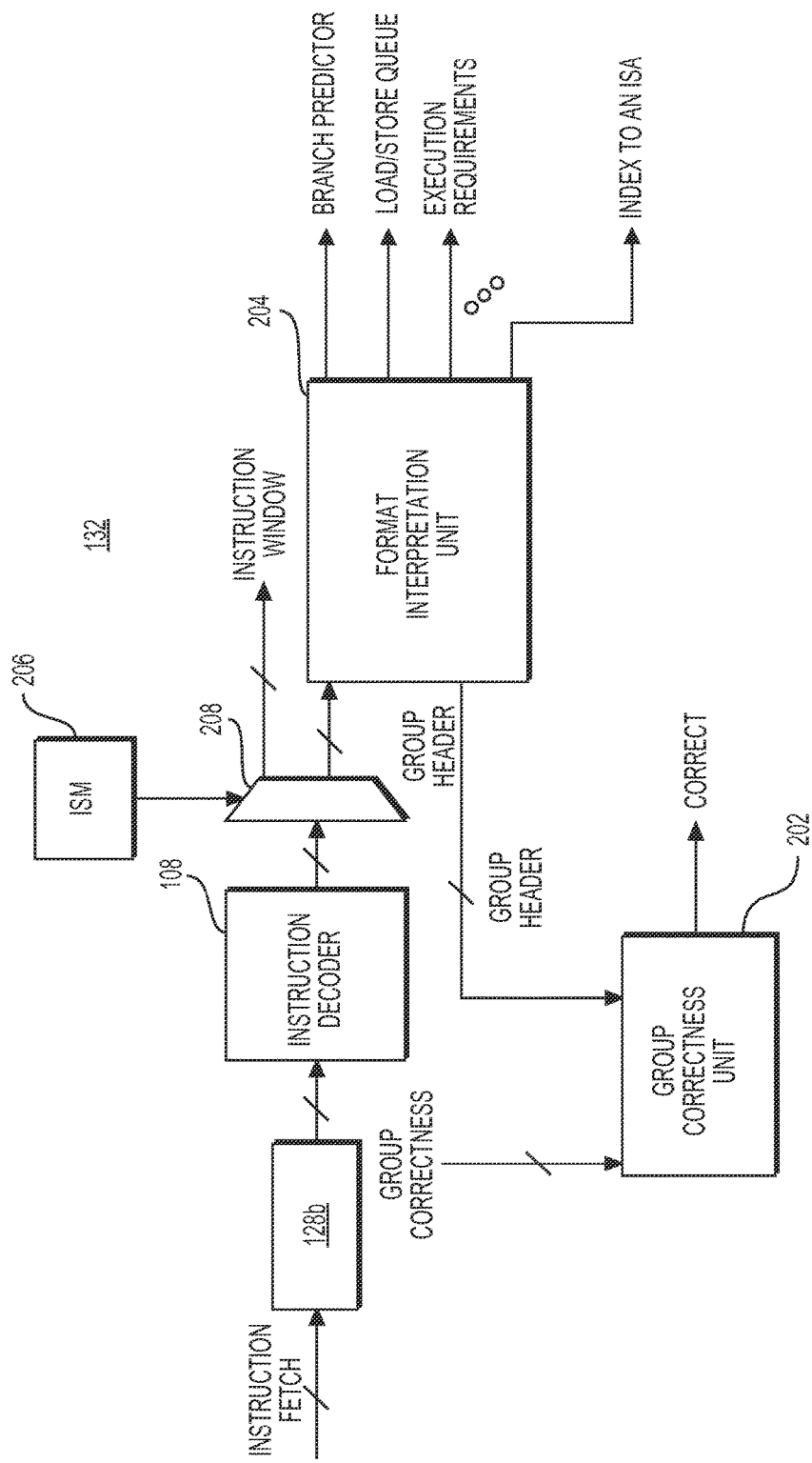
FIG. 2 is a block diagram of a group header control unit in accordance with one example.

FIG. 2 is a block diagram of a group header control unit 132 and its interface with the remaining portions of processor 100 in accordance with one example. Group header control unit 132 may include a group correctness unit 202, a format interpretation unit 204, an instruction state machine (ISM) 206, and a de-multiplexer 208. Front-end control unit 102 may fetch a cache line (e.g., a 128-bit cache line) from instruction cache 104. Fetching may be performed by fetching one byte at a time, eight bytes at a time, or half of a cache-line at a time, or in other quantities. Instruction decoder 108 may decode the cache line and forward the decoded information to de-multiplexer 208. Under the control of ISM 206, the output of de-multiplexer 208 may be provided to instruction window 110 or format interpretation unit 204. Thus, for example, if the cache line contains a group header, then the output of de-multiplexer 208 may be provided to format interpretation unit 204. Although FIG. 2 shows a de-multiplexer 208 that outputs the group header, there may not be a de-multiplexer. Instead, as an example, there may be two different ports and thus the group header may be fetched on a port different from a port for fetching instructions. In one example relating to group of instructions with a fixed size (e.g., 32 instructions) the group header will be at the beginning of a group of instructions and thus the initial value of the program counter (PC) will point to the group header. In another example relating to a group of instructions with a variable size (e.g., 32, 64, 96, or 128 instructions), front-end control unit 102 will provide information regarding the size of the group of instructions currently in the instruction window to group header control unit 132. Once group header control unit 132 has this information, it may use it and the PC value to determine the location of the group header. Although FIG. 2 shows a certain number of components of group header control unit 132 arranged in a certain manner, there could be more or fewer number of components arranged differently.

With continued reference to FIG. 2, format interpretation unit 204 may receive the group header and forward the entire group header to group correctness unit 202. Alternatively, one output of de-multiplexer 208 may be coupled directly to group correctness unit 202. Group correctness unit 202 may also retrieve, from a memory location (e.g., a flash memory location), a previously stored value for a group correctness field. The previously stored value may specify a fixed code pattern or a variable pattern, such as a previously calculated checksum value on the remaining contents of the group header (e.g., as shown in Table 3). In case the previously stored value is a fixed code pattern, then group correctness unit 202 may compare the fixed code pattern retrieved from the memory with the fixed code pattern extracted from the group correctness field of the group header. If there is a match, then group correctness unit 202 may generate a high value for a correct signal. If there is not a match, then group correctness unit 202 may generate a low value for the correct signal. In one example, this will result in processor 100 realizing that this is an illegal jump to a potentially malformed group of instructions. In one example, processor 100 will generate an exception when the correct signal goes to a low value. In case the previously stored value is a variable pattern, such as a previously calculated checksum on the remaining portion of the group header, then group correctness unit may calculate a checksum on the remaining portion of the group header received as part of the fetching process. Group correctness unit 202 may compare the variable pattern retrieved from the memory with the variable pattern generated based on the remaining portion of the group header. If the two variable patterns (e.g., checksums) match, then group correctness unit 202 may generate a high value for a correct signal. If there is not a match, then group correctness unit 202 may generate a low value for the correct signal. In one example, this will result in processor 100 realizing that this is an illegal jump to a potentially malformed group of instructions. In one example, processor 100 will generate an exception when the correct signal goes to a low value. This way processor 100 may advantageously provide secure execution of code by knowing when there is an illegal jump to a malformed group of instructions that might have been placed into the instruction cache or another memory by a hacker. An illegal jump may also advantageously help debug the code during code development.

With continued reference to FIG. 2, format interpretation unit 204 may process the bit values in the various fields of a group header and generate control signals for use by various hardware elements of processor 100. These hardware elements, include, but are not limited to those shown in FIG. 1, including branch predictor 106, instruction decoder 108, instruction scheduler 130, registers 120, and load/store queue 122. In one example, format interpretation unit 204 may process the bit values in the various fields of the group header shown in Table 3 to generate information regarding the group of instructions. In one example, format interpretation unit 204 may generate control information for the group of instructions by processing the field ENCODING FORMAT and determining an encoding format for the information in the group header. In another example, format interpretation unit may generate meta-information for the group of instructions by processing the determined encoding format and the information in the group header. As an example, format interpretation unit 204 may generate a branch predictor signal that may be supplied to branch predictor 106. This signal may provide to branch predictor 106 control information, such as described with respect to the field labeled EXIT TYPES in Table 3. Format interpretation unit 204 may also generate a load/store queue (LSQ) signal that may be supplied to load/store queue 122. This signal may provide to load/store queue 122 control information, such as described with respect to the fields labeled STORE MASK and WRITE MASK in Table 3. Format interpretation unit 204 may also generate execution requirements that may be supplied to other hardware elements, including, e.g., instruction decoder 108 and instruction scheduler 130. These signals may provide control information, such as described with respect to the field labeled XFLAGS in Table 3. Format interpretation unit 204 may also generate an index to an instruction set architecture (ISA) specification. As an example, the ISA specification may include the class of devices that are supported. The class of devices may refer to whether the device is a high-performance device or an Internet-of-Things, mobile devices, wearable devices or other embedded type of devices. The outputs generated by format interpretation unit are merely exemplary and it could generate additional or fewer outputs, as needed. In addition, depending on the bit values in the ENCODING FORMAT field shown in Table 3, format interpretation unit 204 may generate different values of the information provided to the hardware elements. For example, if the ENCODING FOMAT field has k bits, then $2^k$ different values could be generated for the outputs of format interpretation unit 204.

Figure 3:
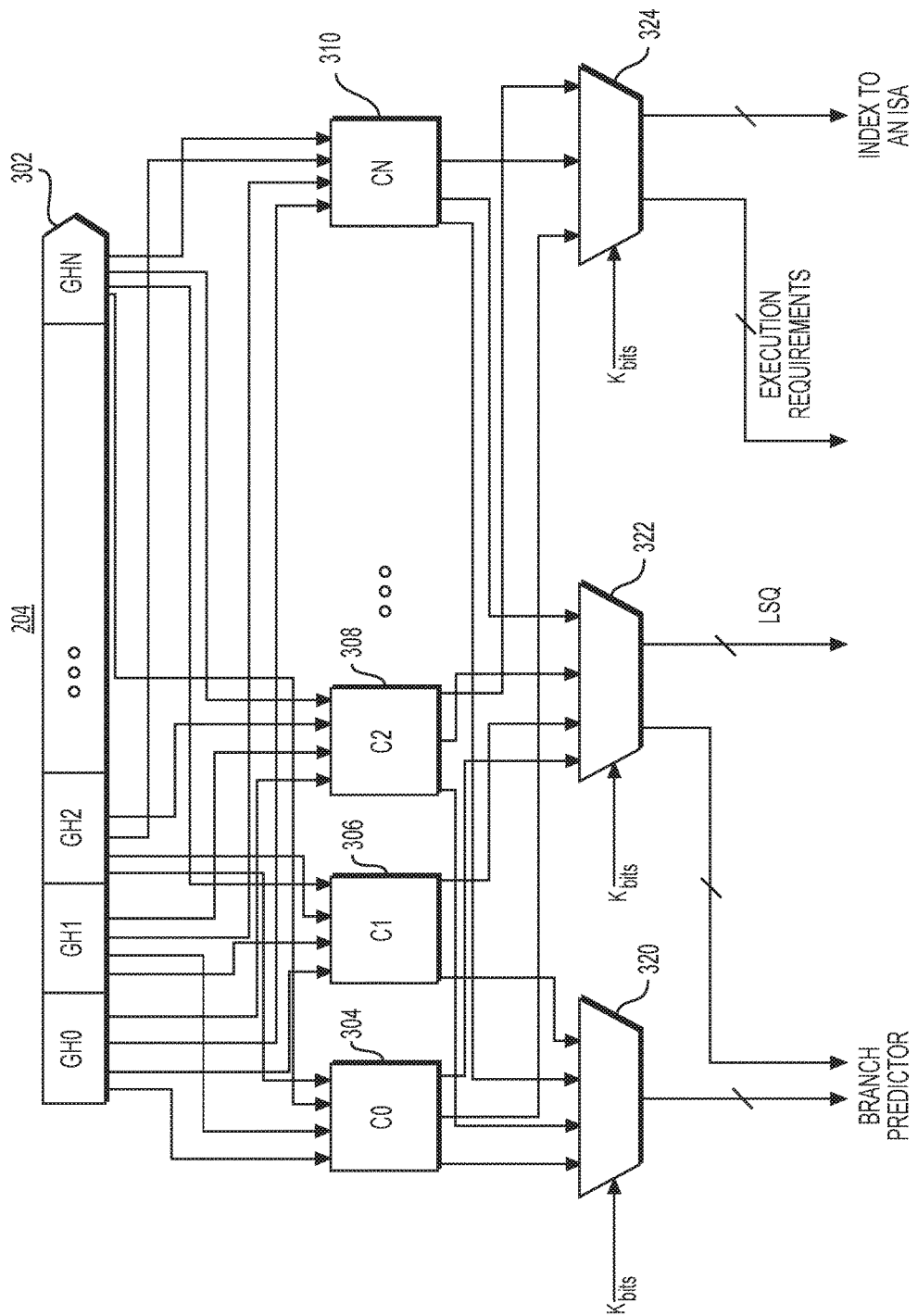
FIG. 3 is a block diagram of a format interpretation unit in accordance with one example.

FIG. 3 is a block diagram of a format interpretation unit 204 in accordance with one example. Format interpretation unit 204 may include a storage unit 302, a first combination-logic unit 304, a second combination-logic unit 306, a third combination-logic unit 308, and a Nth combination-logic unit 310, and multiplexers 320, 322, and 324 that may provide outputs for use by various hardware elements of processor 100 depending on the bit values in the group header. Storage unit 302 may be used to store various fields of a group header (e.g., N fields, where is N is an integer greater than 1, but less than a certain number) GH0, GH1, GH2, and GHN. In one example, the group header could have 128 bits and thus GH0, GH1, GH2, and GHN may contain fields that add up to 128 bits. In one example, these fields may be the fields described with respect to Table 3. The bit values contained in storage unit 302 may be coupled to N combination-logic blocks, including a first combination-logic unit 304, a second combination-logic unit 306, a third combination-logic unit 308, and a Nth combination-logic unit 310. Each of these units may be a hard-coded combination-logic block. Alternatively, at least some or all of these units could be configurable combination-logic blocks. Each combination-logic unit's output may be coupled to N multiplexers, including multiplexers 320, 322, and 324 that may provide outputs for use by various hardware elements of processor 100 depending on the bit values in the group header. Multiplexers 320, 322, and 324 may be controlled using K control bits. The K control bits may be provided by the compiled program and may reflect the selection of a particular group header format and structure. In one example, the K control bits may relate to the ENCODING FORMAT field of Table 3. Although FIG. 3 shows a certain number of components of format interpretation unit 204 arranged in a certain manner, there could be more or fewer number of components arranged differently.

The outputs of the multiplexers may correspond to control signals discussed with respect to FIG. 2. As an example, the outputs of multiplexers may include a branch predictor signal, a load/store queue (LSQ) signal, execution requirements, and an index to an ISA, each of which may be supplied to various hardware elements of processor 100. In one example, the branch predictor signal may be generated from a combination of one or more of the group header bits (e.g., 128 bits) stored in storage unit 302 and as processed by first combination-logic unit 304. Alternatively, as shown in FIG. 3, in another example, the branch predictor signal may be generated from a combination of one or more of the group header bits (e.g., 128 bits) stored in storage unit 302 and as processed by second combination-logic unit 306. In another example, the load/store (LSQ) signal may be generated from a combination of one or more of the group header bits (e.g., 128 bits) stored in storage unit 302 and as processed by third combination-logic unit 308. In another example, the execution requirements signal may be generated from a combination of one or more of the group header bits (e.g., 128 bits) stored in storage unit 302 and as processed by Nth combination-logic unit 308. In another example, the index to an ISA signal may be generated from a combination of one or more of the group header bits (e.g., 128 bits) stored in storage unit 302 and as processed by Nth combination-logic unit 308. Each of the signal values may further be selected based on the values of the K bits used to control the multiplexers. In each of these examples, all of the bits in a group header (e.g., 128 bits) stored in storage unit 302 may not be processed. Instead, a subset of the bits may be processed. In addition, storage unit 302 could store a larger group header or a smaller group header.

Figure 4:
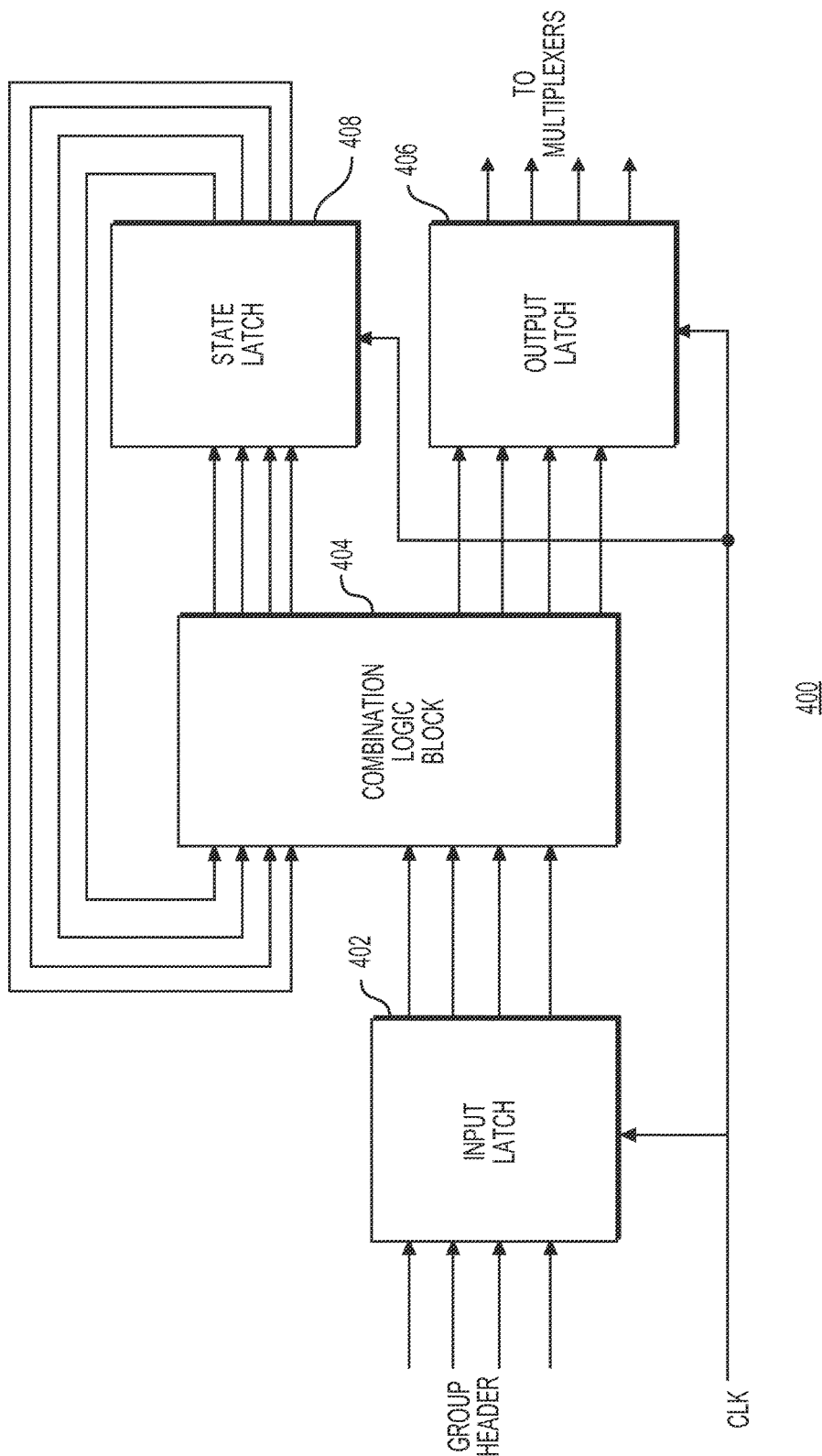
FIG. 4 is a block diagram of a configurable combination-logic unit in accordance with one example.

FIG. 4 is a block diagram of a configurable combination-logic unit 400 in accordance with one example. As an example, any of the combination-logic units 304, 306, 308, and 310 may be implemented as shown in FIG. 4 with respect to configurable combination-logic unit 400. This may advantageously allow a user to change how the encoding format is processed on-the-fly. Alternatively, the combination-logic units could be hard-coded, such that there configuration is fixed and cannot be changed on-the-fly. Configurable combination-logic unit 400 may include an input latch 402, a combination-logic block 404, an output latch 406, and a state latch 408. Each of the three latches may be clocked using the same clock. Input latch 402 may latch bit values in various fields of a group header. Output latch 406 may latch outputs received from combination-logic block 404. State latch 408 may latch state information. Combination-logic block 404 may process the output of input latch 402 and the output of state latch 408 and determine output based on these inputs. Output of output latch 406 may be coupled to multiplexers, e.g., the multiplexers shown in FIG. 3. Combination-logic block 404 may be implemented using programmable logic, such as a programmable logic device (PLD) or a Field-Programmable Gate Array (FPGA). Alternatively, combination-logic block 404 may be implemented with a look-up table that is stored in a programmable flash memory. In any of these implementations, because the behavior of combination-logic block 404 can be changed on-the-fly, it may advantageously allow a user to tailor the processing of encoding format and the group header. Although FIG. 4 shows a certain number of components of configurable combination-logic unit 400 arranged in a certain manner, there could be more or fewer number of components arranged differently. Other techniques may also be used to accomplish the same goal.

FIG. 5 is a flow diagram of a method in accordance with one example. In step 502, as an example, front-end control unit 102 may fetch information regarding a group of instructions, configured to execute atomically by a processor. The information fetched by front-end control unit 102 may include an encoding format for the information regarding the group of instructions. As an example, the information regarding the group of instructions may include control information and/or meta-information regarding the group of instructions.

In step 504, as an example, group header control unit 132 may process the information regarding the group of instructions that was fetched in step 502. As an example, the information regarding the group of instructions may be in a form of a group header with several fields, such as the one described with respect to Table 3. Thus, for example, encoding format may be encapsulated in a field of the group header. Using the encoding format, other fields in the group header may be interpreted with the help of format interpretation unit 204, as described, for example, with respect to FIG. 2 and FIG. 3. Any of the fields described in Table 3 may be processed as part of this step. As an example, processing in step 504 may include determining branch prediction information for the group of instructions based on the determined encoding format. Step 504 may further include determining load/store queue information for the group of instructions based on the determined encoding format. Step 504 may further include determining an index to at least a portion of an instruction set architecture (ISA) based on the determined encoding format. Step 504 may further include determining information regarding a complexity of load operations and store operations in the group of instructions based on the determined encoding format.

FIG. 6 is a flow diagram of a method in accordance with one example. In step 602, as an example, front-end control unit 102 may fetch a group header for a group of instructions, configured to execute atomically by a processor. The group header fetched by front-end control unit 102 may include a field for determining an encoding format for the group header and another field having correctness information to determine the correctness of the group header. As an example, the group header for the group of instructions may include control information and/or meta-information regarding the group of instructions. The group header may contain several fields, e.g., as described with respect to Table 3.

In step 604, as an example, group header control unit 132 may process the encoding format for the group of instructions that was fetched in step 602. Using the encoding format, other fields in the group header may be interpreted with the help of format interpretation unit 204, as described, for example, with respect to FIG. 2 and FIG. 3. Any of the fields described in Table 3 may be processed as part of this step. As an example, processing in step 604 may include determining, based on the determined encoding format, branch prediction information for the group of instructions by processing a field comprising such information. Step 604 may further include determining, based on the determined encoding format, load/store queue information for the group of instructions by processing a field comprising such information. Step 604 may further include determining, based on the determined encoding format, an index to at least a portion of an instruction set architecture (ISA) processing a field comprising such information. Step 604 may further include determining, based on the determined encoding format, information regarding a complexity of load operations and store operations in the group of instructions processing a field comprising such information.

With continued reference to FIG. 6, in step 606, group correctness unit 202 may process the correctness information to determine the correctness of the group header. In one example, the correctness information may be stored as part of a field in the group header. As part of this step, group correctness unit 202 may also retrieve, from a memory location (e.g., a flash memory location), a previously stored value for a group correctness field. The previously stored value may specify a fixed code pattern or a variable pattern, such as a previously calculated checksum value on the remaining contents of the group header (e.g., as shown in Table 3). In case the previously stored value is a fixed code pattern, then group correctness unit 202 may compare the fixed code pattern retrieved from the memory with the fixed code pattern extracted from the group correctness field of the group header. As part of this step, group correctness unit 202 may also compare the variable pattern retrieved from the memory (e.g., a previously calculated checksum based on a content of the remaining fields of a good known group header for the group of instructions) with the variable pattern (e.g., a calculated checksum based on a content of the remaining fields in the group header) generated based on the remaining portion of the group header.

Figure 7:
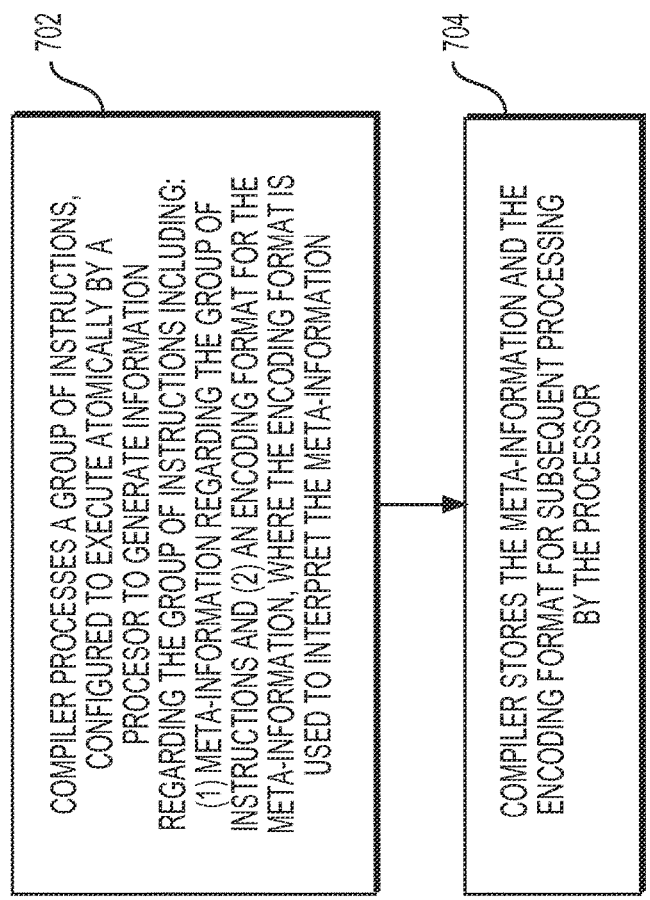
FIG. 7 is a flow diagram of a method in accordance with one example.

FIG. 7 is a flow diagram of a method in accordance with one example. As an example, this method relates to a compiler analyzing a group of instructions and generating or selecting a group header for the group of instructions. In step 702, a suitable compiler may process a group of instructions, configured to execute atomically by a processor, to generate information regarding the group of instructions, including meta-information regarding the group of instructions and an encoding format for the group of instructions. Some programs may be compiled for only one set of ISA, e.g., an ISA used with processors for Internet of Things, mobile devices, wearable devices, or other embedded computing environments. Compiler may use techniques, such as static code analysis or code profiling to generate the information relevant to the group of instructions. Complier may consider factors, such as the characteristics of the group of instructions and the frequency of the execution of the group of instructions. The relevant characteristics of the group of instructions, include, but are not limited to: (1) the instruction level parallelism, (2) the number of loops, (3) the number of predicated control instructions, and (4) the number of branch predictions. One example of a simplified 128 bit group header is shown in Table 4 below:

| 127 115 | 114 112 | 111 64 | 63 32 | 31 14 | 13 6 | 5 1 | 0 |
|---|---|---|---|---|---|---|---|
| GROUP CORRECTNESS | ENCODING FORMAT | WRITE MASK | STORE MASK | EXIT TYPES | XFLAGS | SIZE | ID |

One example of an exemplary program in a high-level language and its compilation into groups of instructions, including group headers (with exemplary structure shown in Table 4), is shown below:

```
                Program:
    int main( ) {
        int a = 1;
        int b = 1;
        int c;
        for (;;) {
            c= a + b;
            if (c >= 100)
                break;
            a = b;
            b = c;
        }
        return c:
    }
```

Compiled program with groups of instructions and group headers:

```
blk0
    header      0, 1, 0, 1, 0, 0, 01, 001
    movi        g3, 1               ; [0] W[3]
    movi        g4, 2               ; [1] W[4]
    bro         blk1                ; [2]
```

-continued

```
blk1
    header      1, 0, 0, 10, 0, 24, 01, 001
    read        t3, g3              ; [0] N[2,L]
    read        t4, g4              ; [1] N[4,R] N[3,L]
    mov         t5, t3              ; [2] N[4,L]
    mov         g3, t4              ; [3] W[3]
                add    g4, t5, t4   ; [4] N[5,L] W[4]
                tlei   p0, t4, 99   ; [5] B[1,P]
    bro_t<p0>   blk1                ; [6] B1
    bro_f<p0>   blk2                ; [7] B1
blk2
```

In the example above, the groups of instructions include instructions, such as read, mov, and add. The read instruction is used to read values of operands from registers. The mov instruction is used to move or copy operands to one or more targets. The add instruction is used to add the two operands provided as part of this instruction. In addition, there are other instructions that illustrate the conversion of a control loop into predicated data flow instructions. The tlei p0, t4, 99 instruction is a "test less than or equal immediate" instruction. As part of this instruction, the operand value of the instruction is compared with an immediate value (e.g., 99) and if the operand value is less than or equal to the immediate value, then a true value is produced; otherwise, a false value is produced. This predicate (true or false) may be broadcast on a channel and may be received as their first operand by bro_t<p0>/blk1 instruction and bro_f<p0> blk2 instruction. The bro_t<p0>blk1 instruction is a "branch with offset" instruction predicated on the result of the tlei instruction being a true value. Similarly, the bro_f<p0>blk2 instruction is a "branch with offset" instruction predicated on the result of the tlei instruction being a false value. Thus, if the result of the tlei instruction is a true value, then the instruction bro_t<p0> blk1 will be executed. Alternatively, if the result of the tlei instruction is a false value, then the instruction bro_f<p0> blk2 will be executed. In this example, the ENCODING FORMAT filed is set to 01. In one example, when processed by format interpretation unit 204 of FIG. 2, these bit values may determine the values for the various control inputs, such as exit types. In addition, in this example, the GROUP CORRECTNESS field is set to 001, which could be used to determine whether the group header is correct, as discussed earlier.

With continued reference to FIG. 7, in step 704, compiler may store the meta-information, the control information (e.g., as shown in the exemplary group headers above) and the encoding format for subsequent processing by a processor, such as processor 100. That processing may include the steps described with respect to FIGS. 5 and 6, respectively.

In conclusion, a method, including fetching a group header for a group of instructions, where the group of instructions is configured to execute atomically by a processor, where the group header includes a first field for determining an encoding format for the group header and a second field comprising correctness information to determine correctness of the group header, is provided. The method may further include processing the encoding format to interpret the information regarding the group of instructions. The information regarding the group of instructions may include at least one of: (1) control information regarding the group of instructions, or (2) meta-information regarding the group of instructions. The method may further include determining, based at least on the encoding format, at least one of: (1) branch prediction information for the group of instructions, (2) load/store queue information for the group of instructions, (3) exit types information for the group of instructions, (4) an index to at least a portion of an instruction set architecture for the processor, (5) information regarding a complexity of load operations and store operations in the group of instructions.

In addition, a processor, including means for fetching information regarding a group of instructions, wherein the group of instructions is configured to execute atomically by a processor, including an encoding format for the information regarding the group of instructions, is provided. The processor may further include a means for processing the encoding format to interpret the information regarding the group of instructions, including determining, based at least on the encoding format, at least one of: (a) branch prediction information for the group of instructions, (b) load/store queue information for the group of instructions, (c) exit types information for the group of instructions, (d) an index to at least a portion of an instruction set architecture for the processor, (e) information regarding complexity of load operations and store operations in the group of instructions, or (f) execution requirements for the group of instructions. In one example, the means for fetching may be front-end control unit 102 of FIG. 1. In addition, in one example, the means for processing the encoding format may be format interpretation unit 204 of FIG. 2. In this exemplary processor, the information regarding the group of instructions may further include correctness information and the processor may further include means determining the correctness of the group of instructions based on the correctness information. In one example, the means for determining the correctness may be a group correctness unit 202 of FIG. 2.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media, e.g., instruction cache 104 or other types of non-transitory media. The term "non-transitory media" as used herein refers to any media storing data and/or instructions that cause a machine, such as processor 100, to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine, such as processor 100. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
   fetching a group of instructions, configured to execute atomically by a processor, and a group header for the group of instructions, wherein the group header comprises a plurality of fields including an encoding format field, wherein the encoding format field is configured to provide to the processor information concerning how to interpret a format of at least one of a remaining of the plurality of fields of the group header for the group of instructions, and wherein the plurality of fields of the group header comprises: a first field comprising first information regarding exit types for use by a branch predictor in making branch predictions for the group of instructions and a second field comprising second information about whether during execution of the group of instructions each of the group of instructions requires independent vector lanes, a third field comprising third information about whether during the execution of the group of instructions branch prediction is inhibited, and a fourth field comprising fourth information about whether during the execution of the group of instructions predicting memory dependencies between memory operations is inhibited; and
   processing the encoding format field to: (1) interpret the first information in the first field to generate a first signal for a branch predictor associated with the processor, (2) interpret the second information in the second field to generate a second signal for an instruction decoder or an instruction scheduler associated with the processor, (3) interpret the third information in the third field to generate a third signal for the branch predictor associated with the processor, and (4) interpret the fourth information in the fourth field to generate a fourth signal to inhibit dependencies between memory operations, including load/store operations.

2. The method of claim 1 further comprising determining, based at least on the encoding format field, load/store queue information for the group of instructions.

3. The method of claim 1, wherein the first information regarding exit types for the group of instructions comprises information concerning whether a branch is to a next group of instructions, whether a branch is to a block relative offset address, or whether a branch is an indirect type of branch.

4. The method of claim 1 further comprising determining, based at least on the encoding format field, an index to at least a portion of an instruction set architecture for the processor.

5. The method of claim 1 further comprising determining, based at least on the encoding format field, information regarding a complexity of load operations and store operations in the group of instructions.

6. The method of claim 1, wherein the group header further comprises correctness information to determine correctness of the group of instructions.

7. The method of claim 6, wherein the correctness information comprises a checksum calculated based on information in the plurality of fields of the group header.

8. A method comprising:
   fetching a group header for a group of instructions, wherein the group of instructions is configured to execute atomically by a processor, and wherein the group header comprises a plurality of fields including a first field for determining an encoding format for the group header, wherein the first field is configured to provide to the processor information concerning how to interpret a format of at least one of a remaining of the plurality of fields of the group header for the group of instructions, a second field comprising correctness information to determine correctness of the group header, a third field comprising information about exit types for use by a branch predictor in making branch predictions for the group of instructions, wherein the information about exit types for the group of instructions comprises information concerning whether a branch is to a next group of instructions, whether a branch is to a block relative offset address, or whether a branch is an indirect type of branch, a fourth field comprising first information about whether during execution of the group of instructions each of the group of instructions requires independent vector lanes, second information about whether during the execution of the group of instructions branch prediction is inhibited, and third information about whether during the execution of the group of instructions predicting memory dependencies between memory operations is inhibited;
   processing the first field to interpret the information about exit types for use by the branch predictor in making the branch predictions for the group of instructions;
   processing the second field to determine the correctness of the group header; and
   processing the first field to: (1) interpret the first information in the fourth field to generate a first signal for an instruction decoder or an instruction scheduler associated with the processor, (3) interpret the second information in the fourth field to generate a second signal for the branch predictor, and (4) interpret the third information in the fourth field to generate a third signal to inhibit dependencies between memory operations, including load/store operations.

9. The method of claim 8 further comprising processing, based at least on the encoding format, a fifth field of the group header to determine load/store queue information for the group of instructions.

10. The method of claim 8 further comprising processing, based at least on the encoding format, a sixth field of the group header to determine an index to at least a portion of an instruction set architecture for the processor.

11. The method of claim 8 further comprising processing, based at least on the encoding format, a seventh field of the group header to determine information regarding a complexity of load and store operations in the group of instructions.

12. The method of claim 8, wherein the correctness information comprises a calculated checksum, wherein the calculated checksum is based on a content of remaining fields in the group header.

13. The method of claim 12 further comprising comparing the calculated checksum with a previously stored checksum to determine correctness of the group of instructions.

14. A processor comprising:
a front-end control unit for fetching a group of instructions, configured to execute atomically by the processor, and a group header for the group of instructions, wherein the group header comprises a plurality of fields including an encoding format field, wherein the encoding format field is configured to provide to the processor information concerning how to interpret a format of at least one of a remaining of the plurality of fields of the group header for the group of instructions; and a format interpretation unit for processing the encoding format field, including determining, based at least on the encoding format field:
load/store queue information for the group of instructions and based on an interpretation of the load/store queue information providing a first signal to the processor,
exit types information for the group of instructions and based on an interpretation of the exit types information providing a second signal to a branch predictor associated with the processor,
information regarding whether during execution of the group of instructions each of the group of instructions requires independent vector lanes and based on an interpretation of the information regarding whether during execution of the group of instructions each of the group of instructions requires independent vector lanes providing a third signal to an instruction decoder or an instruction scheduler associated with the processor,
information regarding whether during the execution of the group of instructions branch prediction is inhibited and based on an interpretation of the information regarding whether during the execution of the group of instructions branch prediction is inhibited providing a fourth signal to the branch predictor associated with the processor, and
information regarding whether during the execution of the group of instructions predicting memory dependencies between memory operations is inhibited.

15. The processor of claim 14, wherein the group header further comprises correctness information, further comprising:
a group correctness unit for determining the correctness of the group of instructions based on the correctness information.

* * * * *